(12) United States Patent
Shimizu et al.

(10) Patent No.: US 12,706,828 B2
(45) Date of Patent: Aug. 11, 2026

(54) INFORMATION PROCESSING APPARATUS, CONTROL METHOD, AND COMPUTER-READABLE RECORDING MEDIUM STORING CONTROL PROGRAM CAPABLE OF SUPPRESSING PERFORMANCE DEGRADATION WHEN UPDATING COUNTER VALUE OF ROUTE INFORMATION

(71) Applicant: Fsas Technologies Inc., Kawasaki (JP)

(72) Inventors: Takashi Shimizu, Kawasaki (JP); Yasumichi Matsuura, Kawasaki (JP)

(73) Assignee: Fsas Technologies Inc., Kawasaki (JP)

( * ) Notice: Subject to any disclaimer, the term of this patent is extended or adjusted under 35 U.S.C. 154(b) by 552 days.

(21) Appl. No.: 18/057,393

(22) Filed: Nov. 21, 2022

(65) Prior Publication Data

US 2023/0254237 A1 Aug. 10, 2023

(30) Foreign Application Priority Data

Feb. 8, 2022 (JP) ................................ 2022-017731

(51) Int. Cl.

*H04L 45/02* (2022.01)
*G06F 3/06* (2006.01)
*H04L 45/74* (2022.01)
*H04L 45/586* (2022.01)

(52) U.S. Cl.

CPC ............ *H04L 45/02* (2013.01); *G06F 3/0611* (2013.01); *G06F 3/0659* (2013.01); *G06F 3/0673* (2013.01); *H04L 45/74* (2013.01); *H04L 45/586* (2013.01)

(58) Field of Classification Search

CPC ......... H04L 45/02; H04L 45/74; H04L 45/76; G06F 3/0611; G06F 3/0659; G06F 3/0673

See application file for complete search history.

(56) References Cited

U.S. PATENT DOCUMENTS 5,809,539 A * 9/1998 Sakakibara ......... G06F 12/0607 711/158
5,818,772 A * 10/1998 Kuge ..................... G11C 29/50 714/719
2003/0058873 A1 3/2003 Geiger et al.
2006/0209827 A1* 9/2006 Calvignac ............... H04L 49/90 370/392
2014/0016648 A1 1/2014 Hidaka
2015/0244633 A1* 8/2015 Aybay ................. H04L 47/6295 709/234

(Continued)

FOREIGN PATENT DOCUMENTS

JP 2018-137616 A 8/2018
WO WO 2012/128282 A1 9/2012

*Primary Examiner* — Jeong S Park
(74) *Attorney, Agent, or Firm* — ArentFox Schiff LLP

(57) ABSTRACT

An information processing apparatus includes a memory in which route information in flow control is stored, and in which flows that include a same ROW address as access destinations are grouped and stored when counter values managed in the route information are updated, and a processor coupled to the memory and configured to rearrange an order of a plurality of flows and access the memory consecutively for the plurality of flows that include the same ROW address as access destinations to update the counter values.

9 Claims, 33 Drawing Sheets

(56) References Cited

U.S. PATENT DOCUMENTS

| | | | | |
|---|---|---|---|---|
| 2016/0202926 | A1* | 7/2016 | Benedict | G06F 12/123<br>711/106 |
| 2018/0191584 | A1* | 7/2018 | Bondar | H04L 43/024 |
| 2019/0260676 | A1* | 8/2019 | Singh | H04L 45/745 |
| 2020/0081631 | A1* | 3/2020 | Schaefer | G06F 3/0619 |
| 2021/0112000 | A1* | 4/2021 | Forster | H04L 41/0803 |

* cited by examiner flow input
hash
NEW REGISTRATION CHECK CIRCUIT
flow/hash input
A1
PERFORM REGISTRATION CHECK
A2
IS flow NEW?
A3
YES
NO
REGISTER flow
A4
DISCARD flow
A5
111
PERFORM REGISTRATION CHECK
REGISTER flow
hash
flow
dddd
flow2
aaac
flow5
aaaa
flow1
flow3
bbbb
flow4
110

FIG. 8

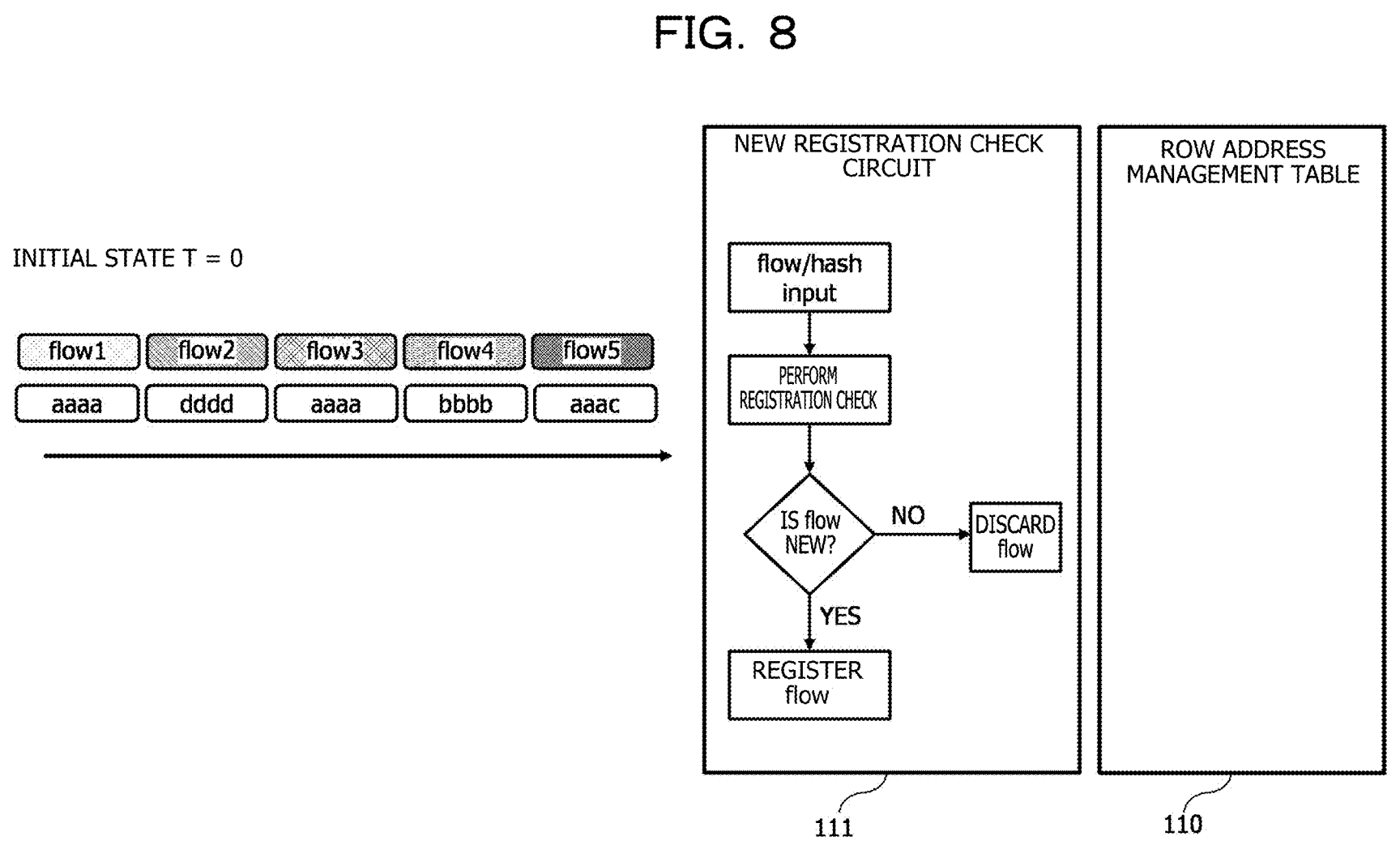

NEW REGISTRATION CHECK CIRCUIT flow/hash input

PERFORM REGISTRATION CHECK

IS flow NEW?

NO

DISCARD flow

YES

REGISTER flow

111

ROW ADDRESS MANAGEMENT TABLE

110

INITIAL STATE T = 0 flow1 aaaa flow2 dddd flow3 aaaa flow4 bbbb flow5 aaac

ROW ADDRESS MANAGEMENT TABLE
110
NEW REGISTRATION CHECK CIRCUIT
111
P01
P02
IS flow5 NEW?
YES
flow/hash input
PERFORM REGISTRATION CHECK
IS flow NEW?
NO
YES
DISCARD flow
REGISTER flow
flow5
aaac
T=1
flow1
aaaa
flow2
dddd
flow3
aaaa
flow4
bbbb T=2
flow1
aaaa
flow2
dddd
flow3
aaaa
flow4
bbbb
NEW REGISTRATION CHECK CIRCUIT
flow5
aaac
flow/hash input
PERFORM REGISTRATION CHECK
IS flow NEW?
YES
REGISTER flow
NO
DISCARD flow
REGISTER flow5 AT aaac
111
ROW ADDRESS MANAGEMENT TABLE
aaac
flow5
P03
110

T=4
flow1
aaaa
flow2
dddd
NEW REGISTRATION CHECK CIRCUIT
flow3
aaaa
flow/hash input
PERFORM REGISTRATION CHECK
IS flow NEW?
YES
REGISTER flow
NO
DISCARD flow
REGISTER flow3 AT aaaa
111
ROW ADDRESS MANAGEMENT TABLE
aaac
flow5
aaaa
flow3
bbbb
flow4
P05
110

T=5
flow1
aaaa
NEW REGISTRATION CHECK CIRCUIT
flow2
dddd
flow/hash input
PERFORM REGISTRATION CHECK
IS flow NEW?
NO
DISCARD flow
YES
REGISTER flow
REGISTER flow2 AT dddd
111
ROW ADDRESS MANAGEMENT TABLE
P06
dddd
flow2
aaac
flow5
aaaa
flow3
bbbb
flow4
110

FIG. 18

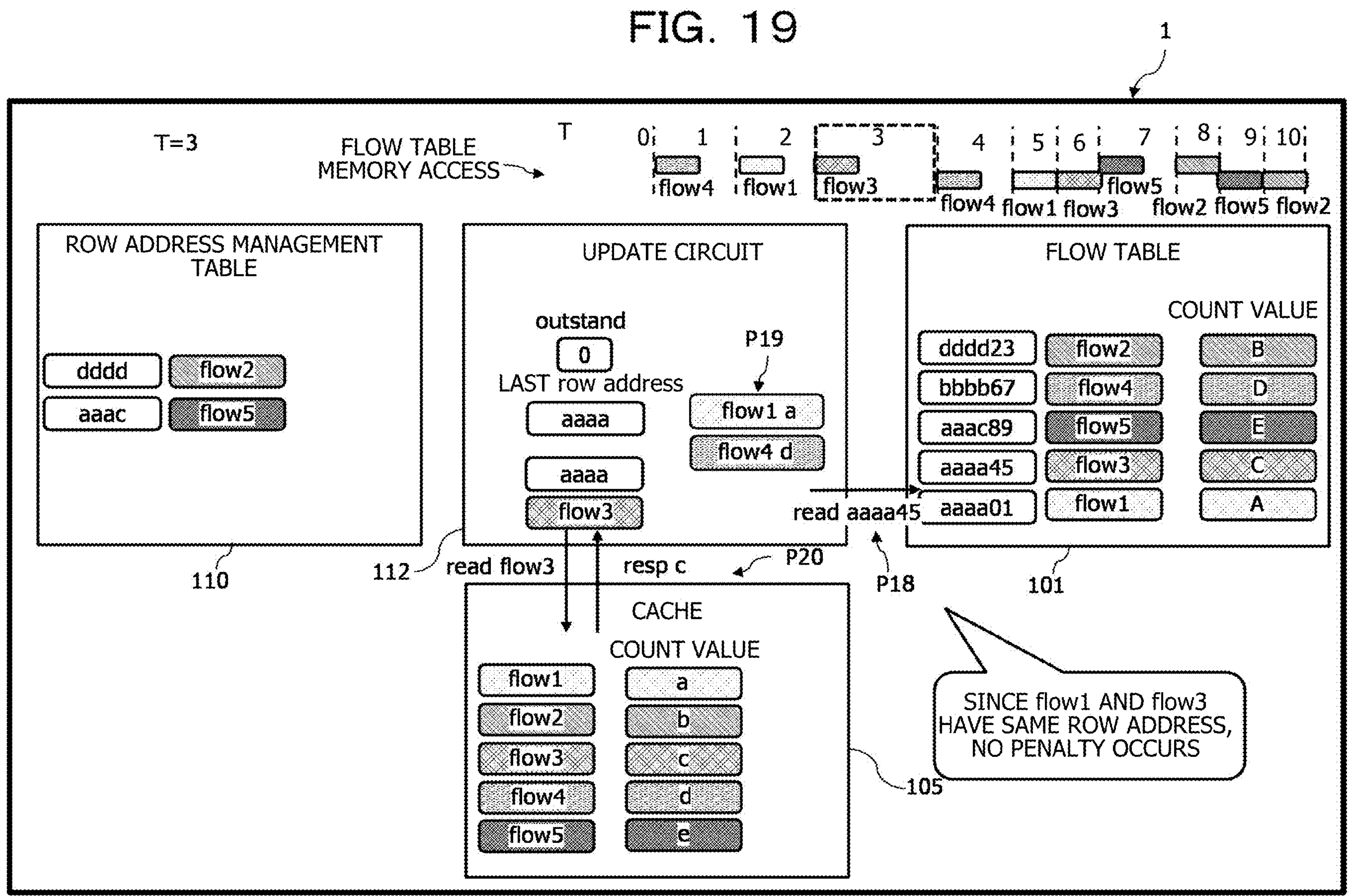
FIG. 19
1
T=3
FLOW TABLE MEMORY ACCESS
T
0
1
2
3
4
5
6
7
8
9
10
flow4
flow1
flow3
flow4
flow1 flow3
flow5
flow2 flow5 flow2
ROW ADDRESS MANAGEMENT TABLE
dddd
flow2
aaac
flow5
110
UPDATE CIRCUIT
outstand
0
LAST row address
aaaa
aaaa
flow3
P19
flow1 a
flow4 d
112
read flow3
resp c
P20
read aaaa45
P18
FLOW TABLE
COUNT VALUE
dddd23
flow2
B
bbbb67
flow4
D
aaac89
flow5
E
aaaa45
flow3
C
aaaa01
flow1
A
101
CACHE
COUNT VALUE
flow1
a
flow2
b
flow3
c
flow4
d
flow5
e
105
SINCE flow1 AND flow3 HAVE SAME ROW ADDRESS, NO PENALTY OCCURS 1
T=5
FLOW TABLE
MEMORY ACCESS
T
0
1
2
3
4
5
6
7
8
9
10
flow4
flow1
flow3
flow4
flow1
flow3
flow5
flow2
flow5
flow2
ROW ADDRESS MANAGEMENT TABLE
dddd
flow2
110
UPDATE CIRCUIT
outstand
1
LAST row address
aaaa
aaac
flow5
flow3 c
112
P24
resp A
write aaaa01 A+a
P25
CACHE
COUNT VALUE
flow1
flow2
flow3
flow4
flow5
a
b
c
d
e
105
FLOW TABLE
P26
COUNT VALUE
dddd23
bbbb67
aaac89
aaaa45
aaaa01
flow2
flow4
flow5
flow3
flow1
B
D+d
E
C
A
101

Figure 22:
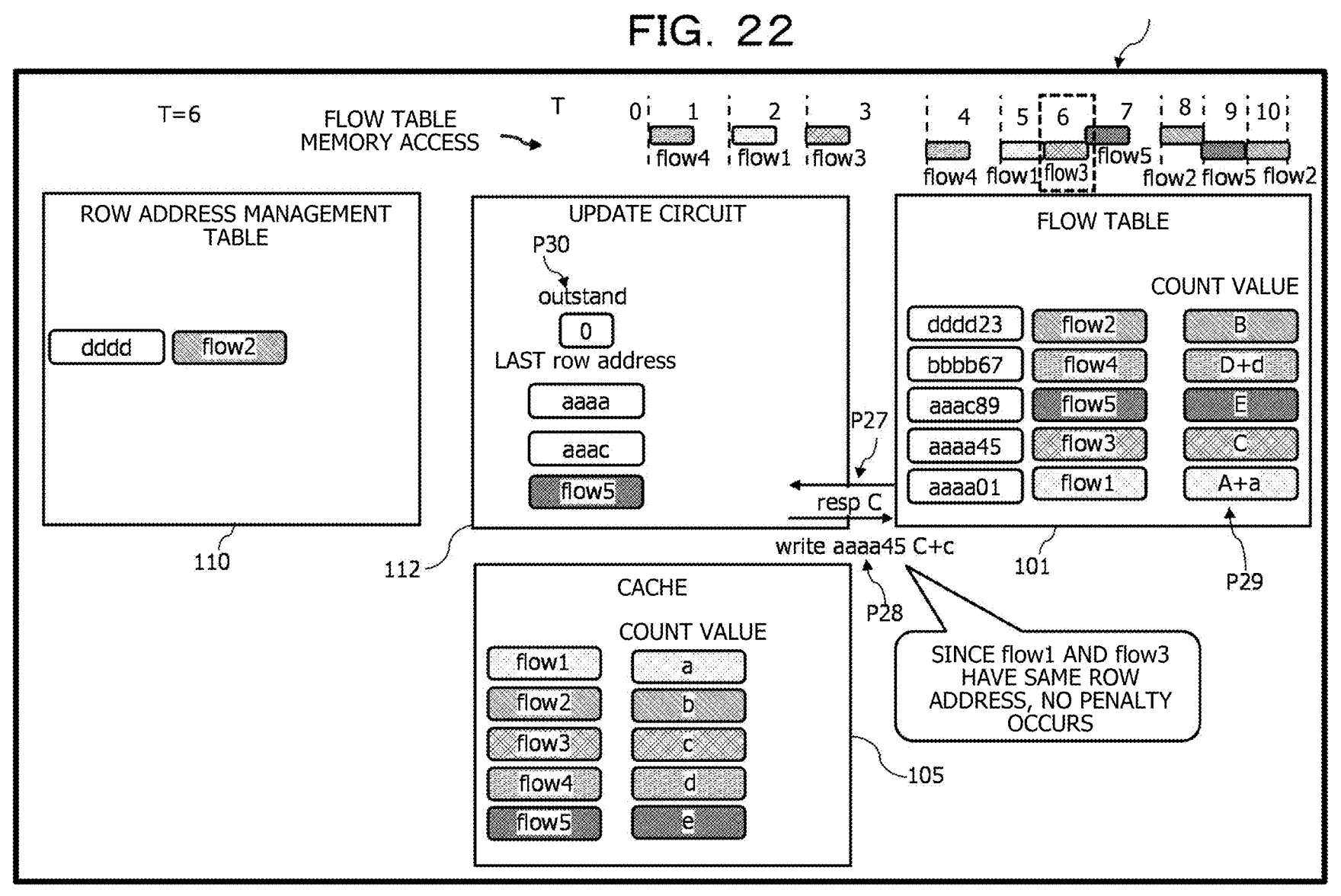

FLOW TABLE MEMORY ACCESS

T 0 1 2 3 4 5 6 7 8 9 10 flow4 flow1 flow3 flow4 flow1 flow3 flow5 flow2 flow5 flow2

ROW ADDRESS MANAGEMENT TABLE dddd flow2

110

UPDATE CIRCUIT

P30 outstand 0

LAST row address aaaa aaac flow5

112

P27 resp C write aaaa45 C+c P28

FLOW TABLE

COUNT VALUE dddd23 flow2 B bbbb67 flow4 D+d aaac89 flow5 E aaaa45 flow3 C aaaa01 flow1 A+a

P29

101

SINCE flow1 AND flow3 HAVE SAME ROW ADDRESS, NO PENALTY OCCURS

105

CACHE

COUNT VALUE flow1 a flow2 b flow3 c flow4 d flow5 e

1
T=8
FLOW TABLE MEMORY ACCESS
T
0
1
2
3
4
5
6
7
8
9
10
flow4
flow1
flow3
flow4
flow1
flow3
flow5
flow2
flow5
flow2
ROW ADDRESS MANAGEMENT TABLE
110
UPDATE CIRCUIT
outstand
0
LAST row address
aaac
flow5 e
dddd
flow2
112
read flow2
resp b
read dddd23
P32
CACHE
COUNT VALUE
flow1
a
flow2
b
flow3
c
flow4
d
flow5
e
105
FLOW TABLE
COUNT VALUE
dddd23
flow2
B
bbbb67
flow4
D+d
aaac89
flow5
E
aaaa45
flow3
C+c
aaaa01
flow1
A+a
101

FIG. 28

| address | 5tuple | action | counter |
|---|---|---|---|
| : | | | |
| 2301ab | dIP:10.21.70.132<br>dPORT:5905... | drop | 2021 |
| : | | | |
| 504021 | dIP:10.21.70.172<br>dPORT:5901... | forward | 351 |
| : | | | |

xxxxyy: FLOW TABLE ADDRESS
xxxx: ROW ADDRESS
yy: COL ADDRESS

INFORMATION PROCESSING APPARATUS, CONTROL METHOD, AND COMPUTER-READABLE RECORDING MEDIUM STORING CONTROL PROGRAM CAPABLE OF SUPPRESSING PERFORMANCE DEGRADATION WHEN UPDATING COUNTER VALUE OF ROUTE INFORMATION

CROSS-REFERENCE TO RELATED APPLICATION

This application is based upon and claims the benefit of priority of the prior Japanese Patent Application No. 2022-17731, filed on Feb. 8, 2022, the entire contents of which are incorporated herein by reference.

FIELD

The embodiment discussed herein is related to an information processing apparatus, a control method, and a computer-readable recording medium storing a control program.

BACKGROUND

A virtual router that implements functions as a router in a network by software is known. Like the router coupling servers to each other and resolving destinations of packets, the virtual router couples virtual machines (VMs) to each other and resolves destinations. The virtual router generally searches many tables to resolve destinations.

The virtual router is implemented by a software defined network (SDN), and includes a control plane and a data plane. The control plane is a plane that manages a flow and sets, for example, a combination of an Internet Protocol (IP) address, a port number, and a destination as the flow.

The data plane is a plane that transfers a packet, and analyzes the content of an inputted packet and performs the same hash calculation as that in the control plane to access a corresponding entry and identify a destination.

The data plane determines the transfer destination of the inputted packet by referring to a flow table based on the IP address and the port number of the transmission destination of the inputted packet.

In a virtual relay device based on software implementation in the related art, packet relaying itself demands high central processing unit (CPU) performance, and consumes calculation resources that would otherwise be provided to an application. This makes it is difficult to satisfy performance conditions of network functions virtualization (NFV).

Accordingly, the function of the data plane that has high processing load in the virtual relay device is offloaded to hardware such as a field-programmable gate array (FPGA) or a smart network interface card (NIC). Offloading some of functions to be implemented by software to hardware may be referred to as hardware offload.

The flow table is updated every time the virtual router transfers a packet.

FIG. 28 is a diagram illustrating a flow table included in the virtual relay device.

The flow table manages an address, a 5-tuple, an action, and a counter for each packet. The information set of the address, the 5-tuple, the action, and the counter described above is used as route information expressing a route along which the packet is to be transferred.

The 5-tuple is a transmission source IP address, a transmission destination IP address of the packet, a transmission source port, a transmission destination port, and a protocol. The action indicates a process to be performed on the packet, such as transfer, block, or address change.

The address is an address of an entry in the flow table, and a value obtained by hashing the 5-tuple by CRC32 or the like is used. CRC is an abbreviation for cyclic redundancy check. The address of the entry in the flow table may be referred to as flow table address.

The counter is a value indicating how many times the packet has arrived. The value of the counter is used when flow aging of deleting an unused entry is performed or a user debugs a network. Hereinafter, the value of the counter may be referred to as counter value.

FIG. 29 is a diagram schematically illustrating a function of updating counters of a flow table in a virtual relay device of a related art. FIG. 30 is a diagram illustrating timings of the respective processes illustrated in FIG. 29.

A packet inputted into the virtual relay device is inputted into a not-illustrated classifier. In this classifier, the 5-tuple is extracted from the inputted packet.

Hashing is performed on the 5-tuple, and the resultant value is inputted into a memory controller (see reference sign P1 in FIG. 29). The memory controller issues a read request (read) to the flow table by using the value (address) obtained by hashing the 5-tuple (see reference sign P2 in FIGS. 29 and 30). Data of a corresponding entry is sent from the flow table in response to this read request (response: see reference sign P3 in FIGS. 29 and 30). The counter value indicates the number of times packets having the same route information have arrived.

The virtual relay device includes two caches (caches A and B) to update the counters of the flow table. One of these two caches A and B (for example, the cache A) is used as a count side that stores values for counter update of the flow table. The other cache (for example, the cache B) is used as an update side that updates the counters of the flow table by using the values for counter update. The caches A and B periodically switch the role as the count side and the role as the update side.

A count-up circuit adds a count value corresponding to a packet to be processed to a count value read from the flow table to create the value for counter update of the flow table. The count-up circuit stores the generated value for counter update in the count-side cache (cache A in the example illustrated in FIG. 29) (see reference sign P4 in FIG. 29). The value for counter update in the update-side cache (cache B in the example illustrated in FIG. 29) is then written to the flow table at a predetermined timing (see reference sign P5 in FIGS. 29 and 30).

In the flow table, for consistency of the counter values, an entry for a subsequent packet may not be read until counter update (write) for a preceding packet is completed.

FIG. 31 is a diagram for explaining a process of updating counters of a flow table in a virtual router of a related art.

FIG. 31 illustrates an example in which three flows of flow2, flow1, and flow1 are processed in this order.

Based on the processing of these flows, a count value cnt1 of flow1 and a count value cnt2 of flow2 are stored in the count-side cache A. Meanwhile, a count value cnt3 of flow3 and a count value cnt2 of flow2 stored in the update-side cache B are written to the flow table, and the counts of the flow table are updated.

International Publication Pamphlet No. WO 2012/128282, Japanese Laid-open Patent Publication No. 2018-

137616, and U.S. Patent Application Publication No. 2003/0058873 are disclosed as related art.

SUMMARY

According to an aspect of the embodiments, an information processing apparatus includes a memory in which route information in flow control is stored, and in which flows that include a same ROW address as access destinations are grouped and stored when counter values managed in the route information are updated, and a processor coupled to the memory and configured to rearrange an order of a plurality of flows and access the memory consecutively for the plurality of flows that include the same ROW address as access destinations to update the counter values.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for explaining processes of the new registration check circuit of the burst control circuit in the virtual router that is an example of the embodiment;

FIG. 18 is a diagram for explaining processes of the update circuit of the burst control circuit in the virtual router that is an example of the embodiment;

FIG. 19 is a diagram for explaining processes of the update circuit of the burst control circuit in the virtual router that is an example of the embodiment;

FIG. 22 is a diagram for explaining processes of the update circuit of the burst control circuit in the virtual router that is an example of the embodiment;

FIG. 28 is a diagram illustrating the flow table included in the virtual router;

DESCRIPTION OF EMBODIMENTS

In such a virtual router of the related art, there is a case where the updating of the count values of the flow table sometimes takes more time than the registering of the count values in the count-side cache for the flow table update. As a result, there occurs a case where the updating of the flow table takes more time than the time it takes for the count-side cache to overflow, and is unable to catch up with the registering.

For example, assume a case where the number of entries in each of the caches A and B is 1000. In this case, although there is a risk that the count-side cache may overflow in 1000 cycles, updating of 1000 entries is sometimes impossible to perform in 1000 cycles in the flow table.

Such a problem occurs due to a structural problem of a dynamic random-access memory (DRAM) used for the flow table.

Figure 32:
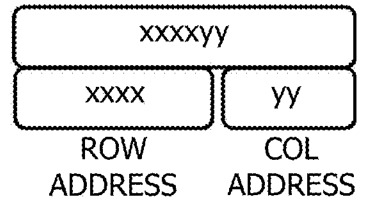
FIG. 32 is a diagram illustrating a relationship between a flow table address and a set of a ROW address and a COL address in a DRAM.

FIG. 32 is a diagram illustrating a relationship between a flow table address and a set of a ROW address and a COL address in the DRAM.

A flow table address "xxxxyy" illustrated in FIG. 32 is a hash value of a 5-tuple. Among the six digits "xxxxyy" forming the flow table address, the first four digits "xxxx" are the ROW address, and the last two digits "yy" are the COL address.

Figure 33:
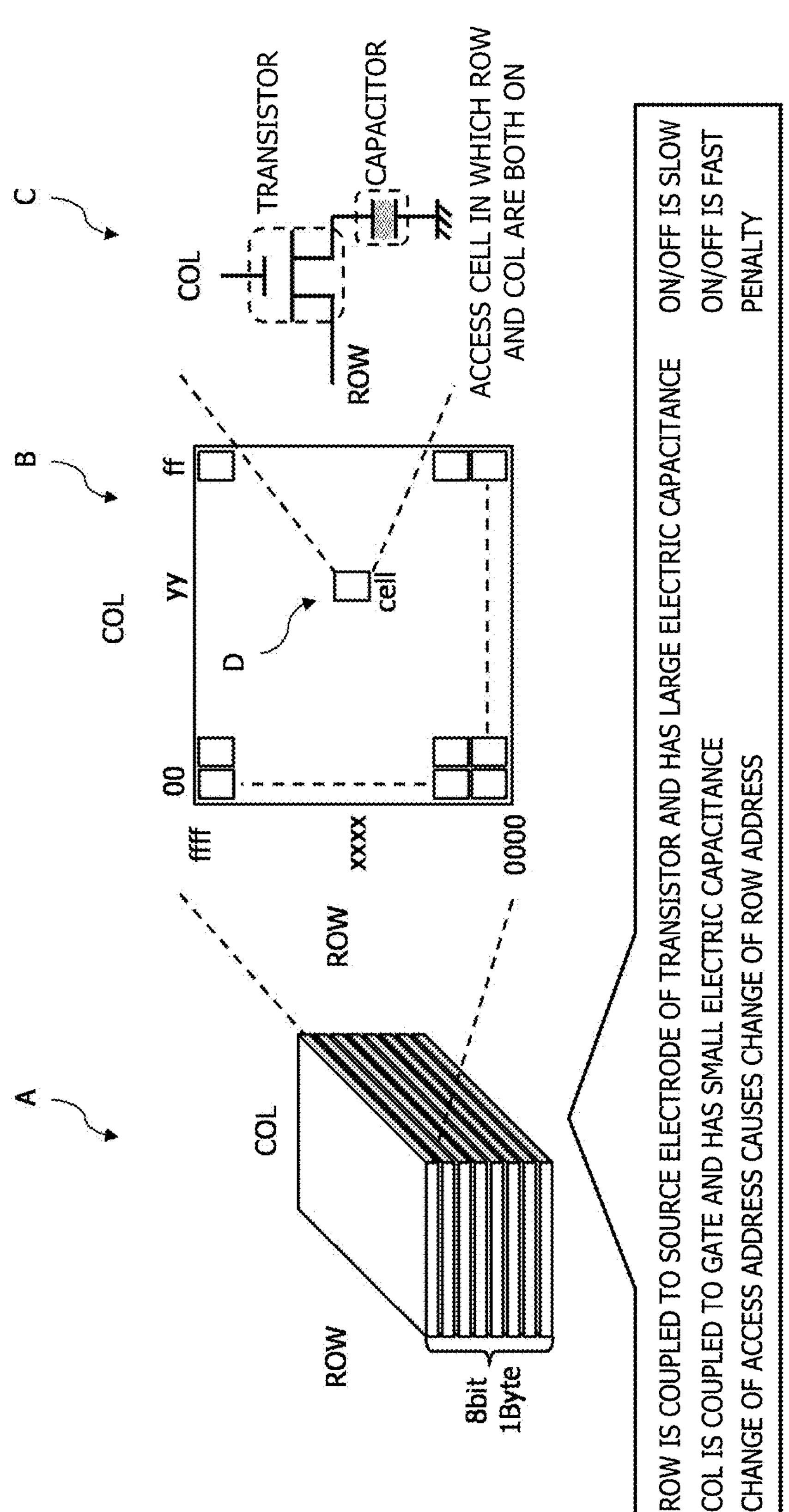
FIG. 33 is a diagram schematically illustrating a structure of a DRAM.

FIG. 33 is a diagram schematically illustrating a structure of the DRAM.

The DRAM is formed by stacking multiple cell arrays, in which multiple memory cells are arranged in vertical and horizontal directions, one on top of another in a layered form.

In FIG. 33, reference sign A denotes a configuration of the DRAM formed by stacking the cell arrays one on top of another in the layered form, and reference sign B denotes one of the cell arrays in which the multiple memory cells are arranged in the vertical and horizontal directions. In the diagram denoted by reference sign B, a memory cell corresponding to the flow table address "xxxxyy" is denoted by reference sign D. In FIG. 33, reference sign C denotes a configuration of one memory cell.

The memory cell includes a transistor and a capacitor, and the capacitor is arranged in series with the transistor.

COL is coupled to a gate of the transistor and has a small electric capacitance. Accordingly, it is possible to perform ON/OFF switching in a short time and perform COL change in memory access at high speed.

Meanwhile, ROW is coupled to a source power supply of the transistor, and has a large electric capacitance. Accordingly, ON/OFF switching takes time, and ROW address change in memory access is slow. Slow-down in memory access may be referred to as penalty.

For example, in the DRAM, when a change of the access address causes a change of the ROW address, a delay (penalty) occurs in the access.

An embodiment of techniques capable of suppressing a decrease in performance when a counter value of route information is updated is described below with reference to the drawings. Note that the following embodiment is merely exemplary, and there is no intension of excluding application of various modification examples and techniques that are not explicitly described in the embodiment. For example, the present embodiment may be carried out while being variously modified within a scope not departing from the gist of the embodiment. The drawings are not provided with an intention that only the elements illustrated in the drawings are included. Other functions and the like may be included.

Embodiment

Configuration

Figure 1:
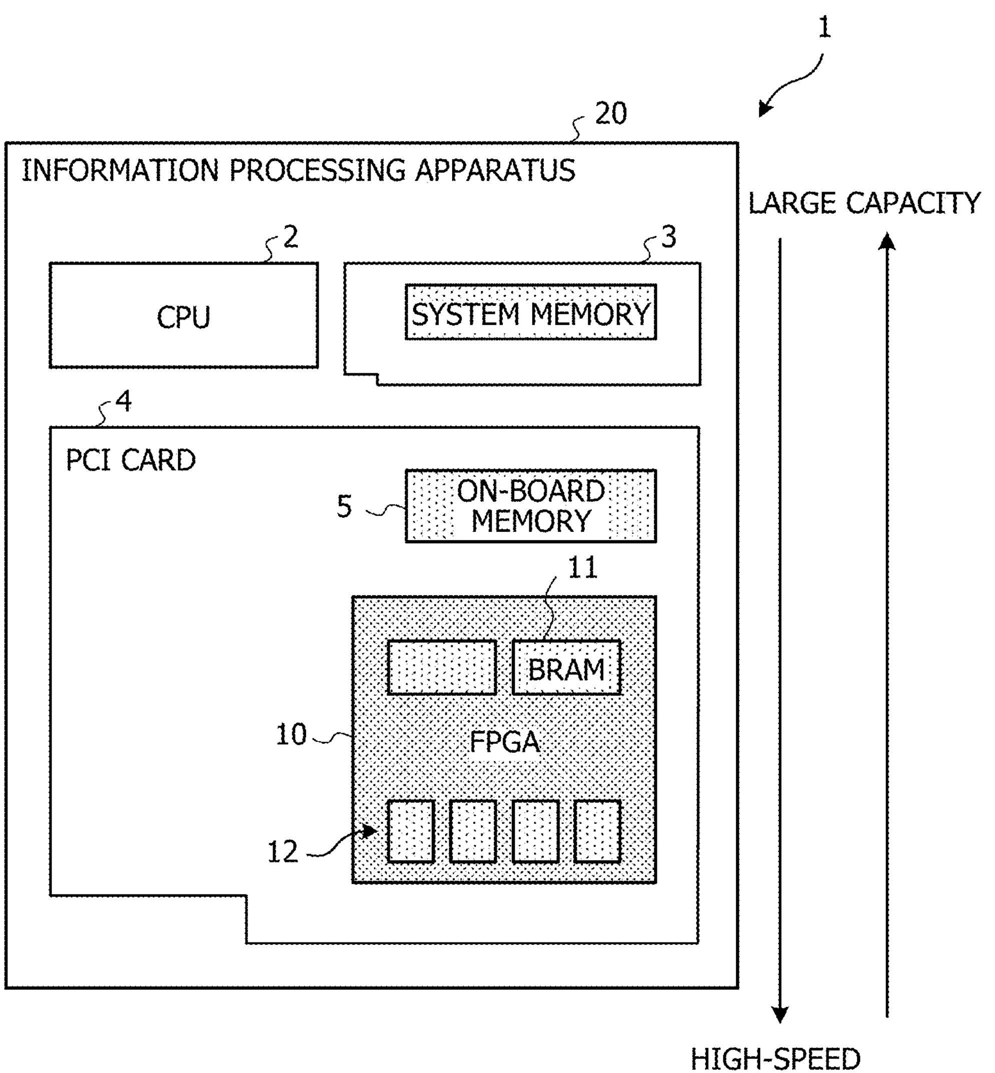
FIG. 1 a diagram illustrating a hardware configuration of an information processing apparatus that implements functions of a virtual router being an example of the embodiment.

FIG. 1 is a diagram illustrating a hardware configuration of an information processing apparatus 20 that implements functions of a virtual router 1 being an example of the embodiment.

For example, the information processing apparatus 20 may be a computer having a server function. The information processing apparatus 20 implements functions as the virtual router 1.

The virtual router 1 implements a packet relay function of transmitting and receiving (transferring) packets between not-illustrated virtual machines or between a virtual machine and another apparatus that is not illustrated. The virtual machine may be referred to as VM.

The virtual machine is, for example, a virtual computer created on an application program such as a hypervisor. The virtual machine executes various processes in the same manner as a computer implemented by physical hardware.

The virtual machine includes a virtual port (not illustrated), and transmits and receives packets via the virtual port. The virtual port is specified by using a port number.

As illustrated in FIG. 1, the information processing apparatus 20 includes a CPU 2, a system memory 3, and a Peripheral Component Interconnect (PCI) card 4.

The CPU 2 is a processing device that performs various types of control and computation, and achieves various functions by executing an OS and a program stored in the system memory 3. For example, the CPU 2 implements the functions as the virtual router.

The system memory 3 is a storage memory including a read-only memory (ROM) and a random-access memory (RAM). A software program related to virtual router control and data and the like for this program are written in the ROM of the system memory 3. The software program on the system memory 3 is read and executed by the CPU 2 as appropriate. The RAM of the system memory 3 is used as a primary storage memory or a working memory.

The information processing apparatus 20 may include a not-illustrated storage device. The storage device is a storage device such as a hard disk drive (HDD), a solid-state drive (SSD), or a storage class memory (SCM), and is a device that stores various pieces of data.

The PCI card 4 is an expansion card that expands functions of the information processing apparatus 20, and is attached to, for example, a not-illustrated main board (motherboard) of the information processing apparatus 20. The PCI card 4 communicates with the main board of the information processing apparatus 20 via a PCI bus.

As illustrated in FIG. 1, the PCI card 4 includes an on-board memory 5 and an FPGA 10. The on-board memory 5 stores a program (configuration data) to be a base of a logic circuit in the FPGA 10. For example, the on-board memory 5 is a DRAM.

The FPGA 10 is a device in which a circuit design of a digital circuit may be electrically changed. The FPGA 10 is a large scale integration (LSI) circuit including many logic gates. Writing configuration data to a configuration RAM (not illustrated) included in the FPGA 10 causes the FPGA 10 to function as a predetermined logic circuit, the configuration data describing logical relationships and coupling relationships among the logic gates.

The FPGA 10 includes a block random-access memory (BRAM) 11 and multiple registers 12, and when the FPGA 10 is powered on, a program file (bit stream data) is loaded from the on-board memory 5 and is loaded to the BRAM 11 in the FPGA 10.

Individual bits of the bit stream data loaded to the BRAM 11 serve as an information source of a user circuit to be implemented on the FPGA 10 and resources provided in the FPGA 10 are customized to implement a predetermined circuit. In the information processing apparatus 20, the FPGA 10 at least partially achieves functions of a data plane in the virtual router 1.

Various pieces of data and the like generated when the FPGA 10 functions as the data plane are temporarily stored in the registers 12.

Figure 2:
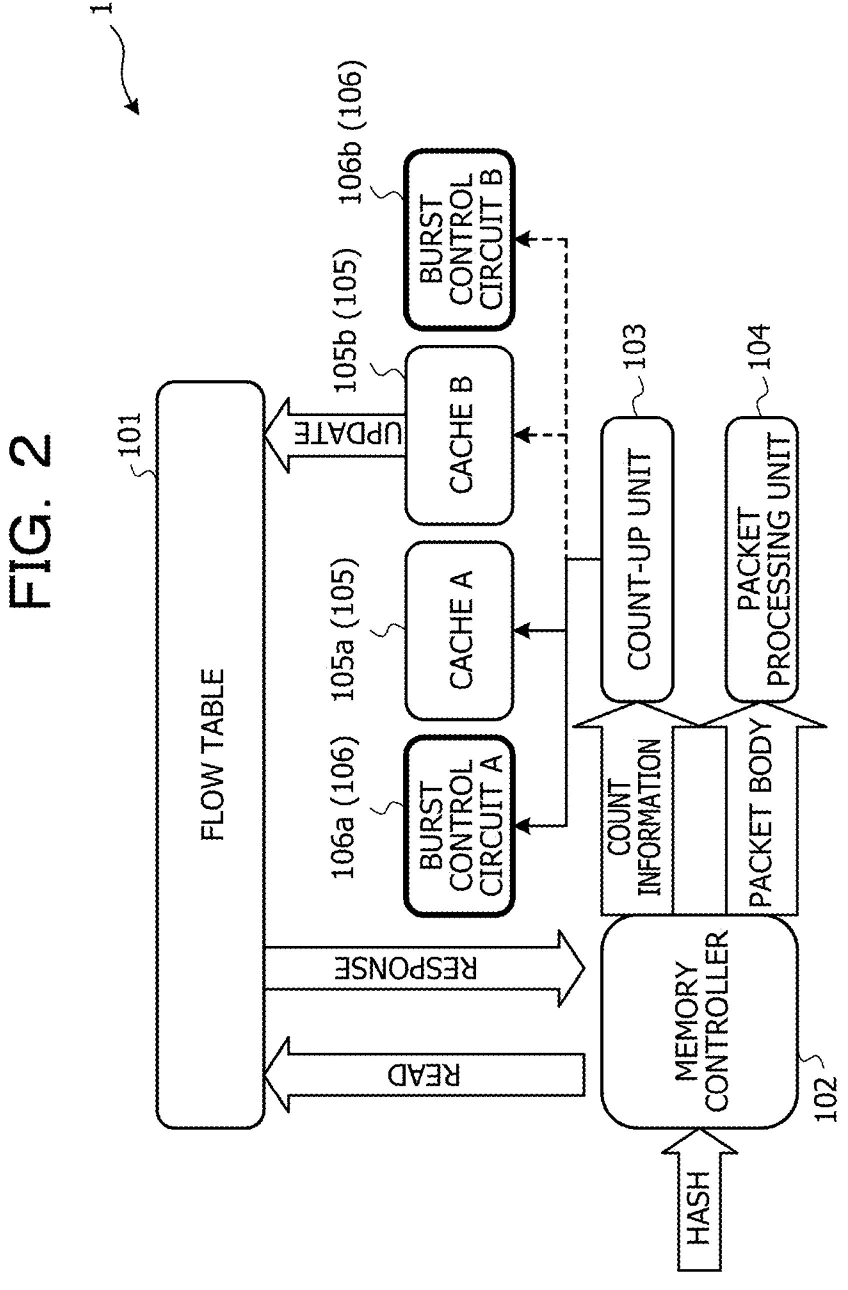
FIG. 2 is a diagram illustrating a functional configuration of the virtual router that is an example of the embodiment.

FIG. 2 is a diagram illustrating a functional configuration of the virtual router 1 that is an example of the embodiment.

The virtual router 1 illustrated in FIG. 2 includes a flow table 101, a memory controller 102, a count-up unit 103, a packet processing unit 104, caches 105*a* and 105*b*, and burst control circuits 106*a* and 106*b*.

The flow table 101 manages, for example, an address, a 5-tuple, an action, and a counter (counter value) for a packet to be processed in the virtual router 1. The address, the 5-tuple, the action, and the counter managed in the flow table 101 are used as route information specifying a transfer route of the packet in flow control. In this virtual router 1, information forming the flow table 101 is stored in the on-board memory 5.

The address in the flow table 101 is a flow table address, and a value obtained by hashing the 5-tuple of a flow by CRC32 or the like is used as the address. This address is formed as a combination (see FIG. 32) of a ROW address and a COL address in the DRAM forming the on-board memory 5.

Each of the caches 105*a* and 105*b* stores a value (counter update value) for updating a counter of the flow table 101. Hereinafter, the cache 105*a* may be referred to as cache A. The cache 105*b* may be referred to as cache B. Hereinafter, when the caches 105*a* and 105*b* are, for example, not distinguished from each other, they are referred to as the caches 105.

One cache 105 (for example, the cache 105*a*) out of these two caches 105*a* and 105*b* is used to store the counter update value of the flow table 101. The cache 105 used to store the counter update value of the flow table 101 as described above may be referred to as count side.

The other cache 105 (for example, the cache 105*b*) is used to update a counter value in the flow table 101 by using the counter update value. The cache 105 used to update the counter value in the flow table 101 as described above may be referred to as update side.

The caches 105*a* and 105*b* switch the role as the count side and the role as the update side at a predetermined timing (for example, periodically).

The memory controller 102 makes a request for reading data of an entry that has the value obtained by hashing the 5-tuple of the inputted packet as an address, to the flow table.

The memory controller 102 receives the data of the corresponding entry sent from the flow table in response to this read request.

The memory controllers 102 extracts a count value from information on the received data of the entry, and transfers the count value to the count-up unit 103.

The memory controller 102 also transfers the inputted packet (packet body) to the packet processing unit 104.

The packet processing unit 104 processes the inputted packet according to the action of the entry whose address coincides with that of the inputted packet in the flow table. For example, when "forward" is set in the action of the flow table, the packet processing unit 104 transmits the inputted packet to a transmission destination specified by a transmission destination IP address and a transmission destination port in the 5-tuple.

The count-up unit 103 creates the counter update value by adding a count value corresponding to a packet to be processed to a count value read from the flow table. The count-up unit 103 stores the created counter update value in the count-side cache 105 (cache 105*a* in the example illustrated in FIG. 2). The counter update value in the update-side cache 105 (cache 105*b* in the example illustrated in FIG. 2) is then written to the flow table 101 at a predetermined timing.

Each of the burst control circuits 106*a* and 106*b* manages flows whose ROW addresses of the flow table addresses are the same. The burst control circuit 106*a* is provided to correspond to the cache 105*a*, and the burst control circuit 106*b* is provided to correspond to the cache 105*b*.

Hereinafter, when the burst control circuits 106*a* and 106*b* are, for example, not distinguished from each other, they are referred to as burst control circuits 106. The burst control circuits 106 may be included in the FPGA 10.

Figure 3:
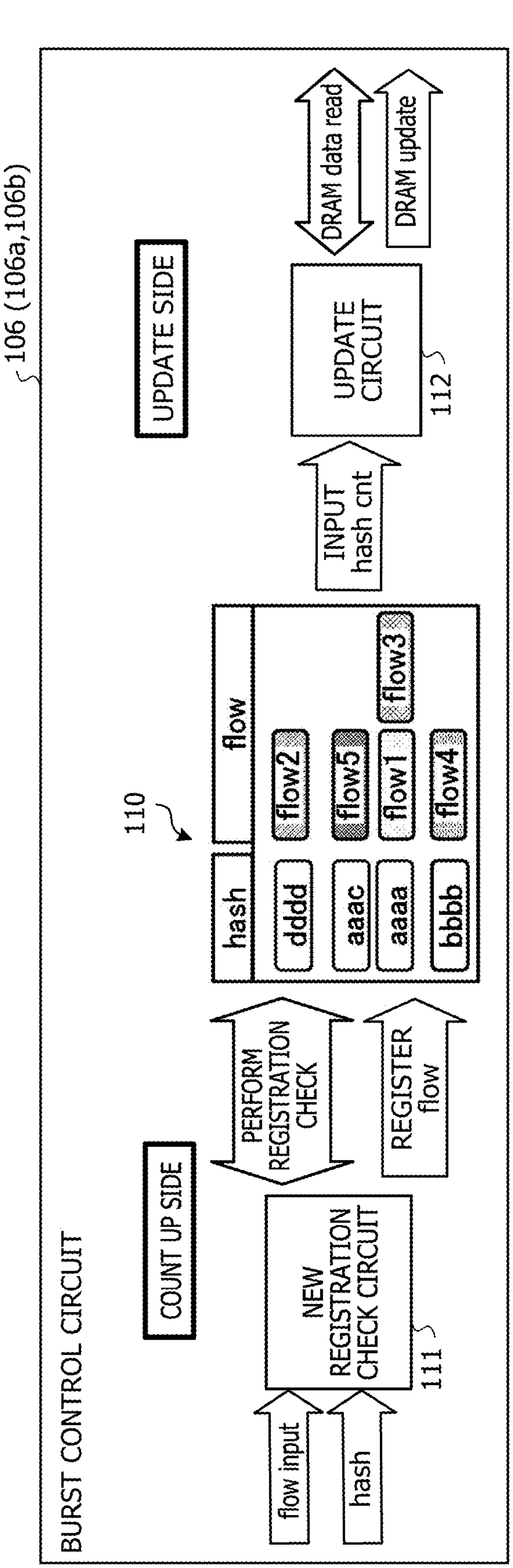
FIG. 3 is a diagram illustrating a configuration of a burst control circuit in the virtual router that is an example of the embodiment.

FIG. 3 is a diagram illustrating a configuration of each of the burst control circuits 106 in the virtual router 1 that is an example of the embodiment.

As illustrated in FIG. 3, the burst control circuit 106 includes a new registration check circuit 111, a ROW address management table 110, and an update circuit 112.

The ROW address management table 110 illustrated in FIG. 3 associates a hash value (hash) with a flow.

The hash value (hash) is the ROW address extracted from the value (flow table address) obtained by hashing the 5-tuple of the flow. The flow is information for specifying the flow.

The ROW address management table 110 corresponds to a storage unit in which flows that have the same ROW address of the on-board memory 5 as access destinations are grouped and stored.

For example, in the ROW address management table 110 illustrated in FIG. 3, the ROW address of flow2 is "dddd". The ROW addresses of flow1 and flow3 are both "aaaa". As described above, in the ROW address management table 110, flows with the same ROW address are managed as the same group. It may be said that the ROW address management table 110 manages flows with the same ROW address.

As described above, the flows with the same ROW address may be easily recognized by referring to the ROW address management table 110.

The new registration check circuit 111 performs a process of registering a flow in the ROW address management table 110. For example, when a new flow that is not registered in the ROW address management table 110 is inputted, the new registration check circuit 111 registers the flow in the ROW address management table 110.

In this case, if another flow is already registered in the ROW address management table 110 for the same ROW address as the ROW address of the flow to be newly registered, the new registration check circuit 111 adds the new flow in association with this same ROW address. For example, the new registration check circuit 111 registers the flows with the same ROW address as the same group in the ROW address management table 110.

Figure 4:
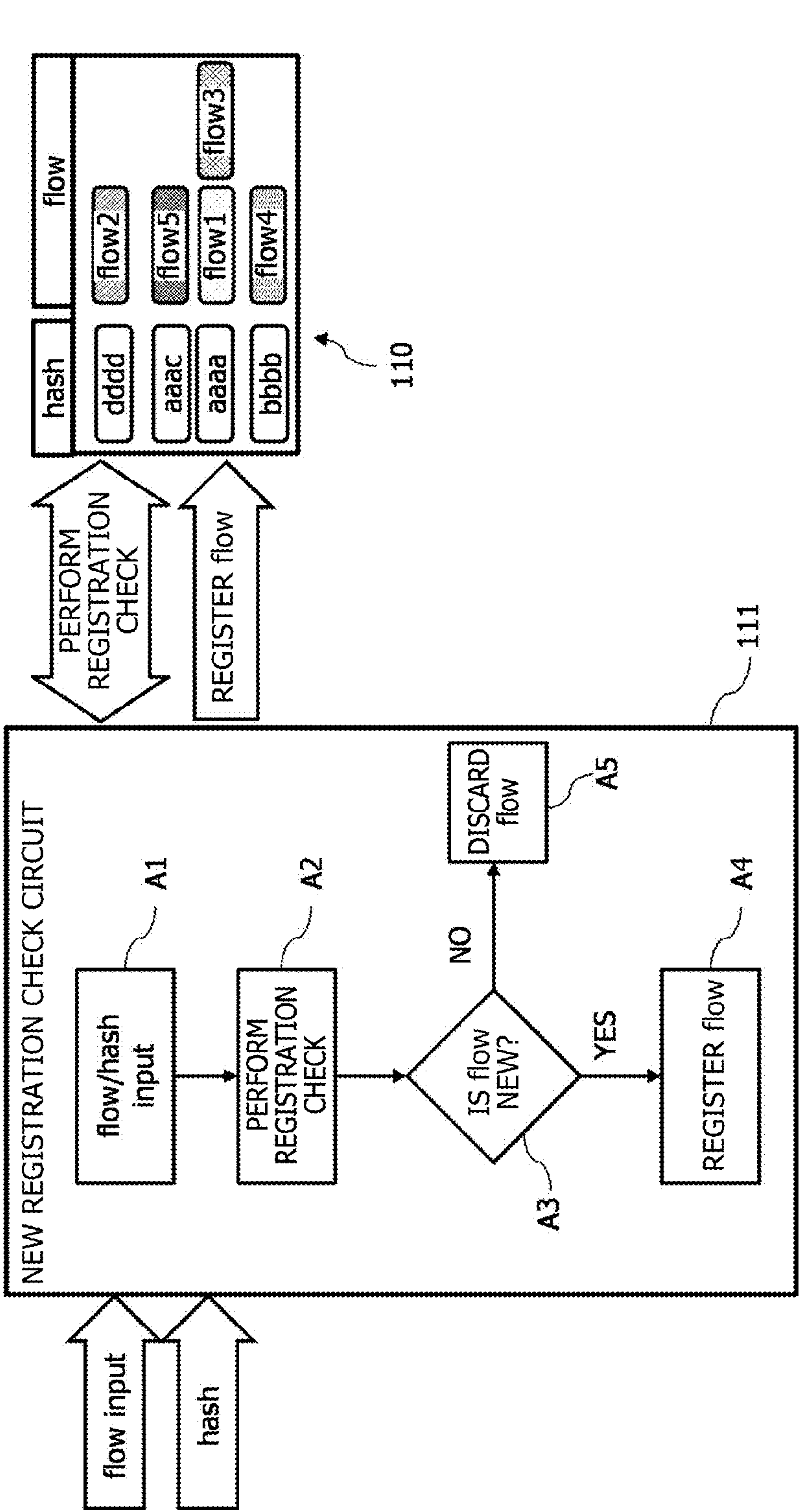
FIG. 4 is a diagram for explaining functions of a new registration check circuit in the virtual router that is an example of the embodiment.

FIG. 4 is a diagram for explaining functions of the new registration check circuit 111 in the virtual router 1 that is an example of the embodiment.

FIG. 4 illustrates processes (functions) of the new registration check circuit 111 in a form of a flowchart (operations A1 to A5).

A flow (flow input) and a value (hash) obtained by hashing the 5-tuple of the flow are inputted into the new registration check circuit 111 (see operation A1).

The new registration check circuit 111 checks whether or not the inputted flow is a new flow that is not registered in the ROW address management table 110 (registration check is performed; operation A2). For example, the new registration check circuit 111 checks whether or not the flow is to be registered in the ROW address management table 110.

When the flow is a new flow in the result of the registration check (see YES route of operation A3), information specifying the flow and the ROW address of the flow are registered in the ROW address management table 110 (operation A4). Meanwhile, when the flow is not a new flow (see NO route of operation A3), the flow is discarded (may also be referred to as canceled) (operation A5). The new registration check circuit 111 in the burst control circuit 106 may be referred to as count up side.

The update circuit 112 performs a process of updating a count value of the flow table 101 by referring to the ROW address management table 110.

The value (hash) obtained by hashing the 5-tuple of a flow and the count value (cnt) of the flow read from the flow table 101 are inputted into the update circuit 112.

The update circuit 112 also implements such a function that, when the counters in the flow table 101 are updated, the update circuit 112 controls the order in which multiple inputted flows are to be processed such that flows whose ROW addresses of the flow table addresses are the same are consecutively arranged.

To this end, the update circuit 112 uses a count value outstand to manage the number of consecutive flows. The count value outstand may be stored in a predetermined storage area such as the register 12. The update circuit 112 may store the count value outstand in a predetermined storage area such as a not-illustrated memory mounted in the update circuit 112.

The update circuit 112 manages the ROW address of each inputted flow by storing the ROW address in a predetermined storage area such as the register 12. The update circuit 112 may thereby grasp the ROW address of the flow processed in the last process and the ROW address of the newly-inputted flow. The update circuit 112 may store the ROW address of each inputted flow in a predetermined storage area such as a not-illustrated memory mounted in the update circuit 112.

The ROW address of a flow processed in the last process may be referred to as last ROW address.

The update circuit 112 also has a function of updating a counter value of the flow table 101. To this end, the update circuit 112 may read the count value of a specific flow from the cache 105, and store the read count value in a predetermined storage area such as the register 12. The update circuit 112 may store the count value in a predetermined storage area such as a not-illustrated memory mounted in the update circuit 112.

The update circuit 112 stores the count value of the flow sent as a response from the flow table 101 and the flow table address of the flow, in a predetermined storage area such as the register 12. The update circuit 112 may store the count value of the flow sent as a response from the flow table 101 and the flow table address of the flow, in a predetermined storage area such as a not-illustrated memory mounted in the update circuit 112.

Figure 5:
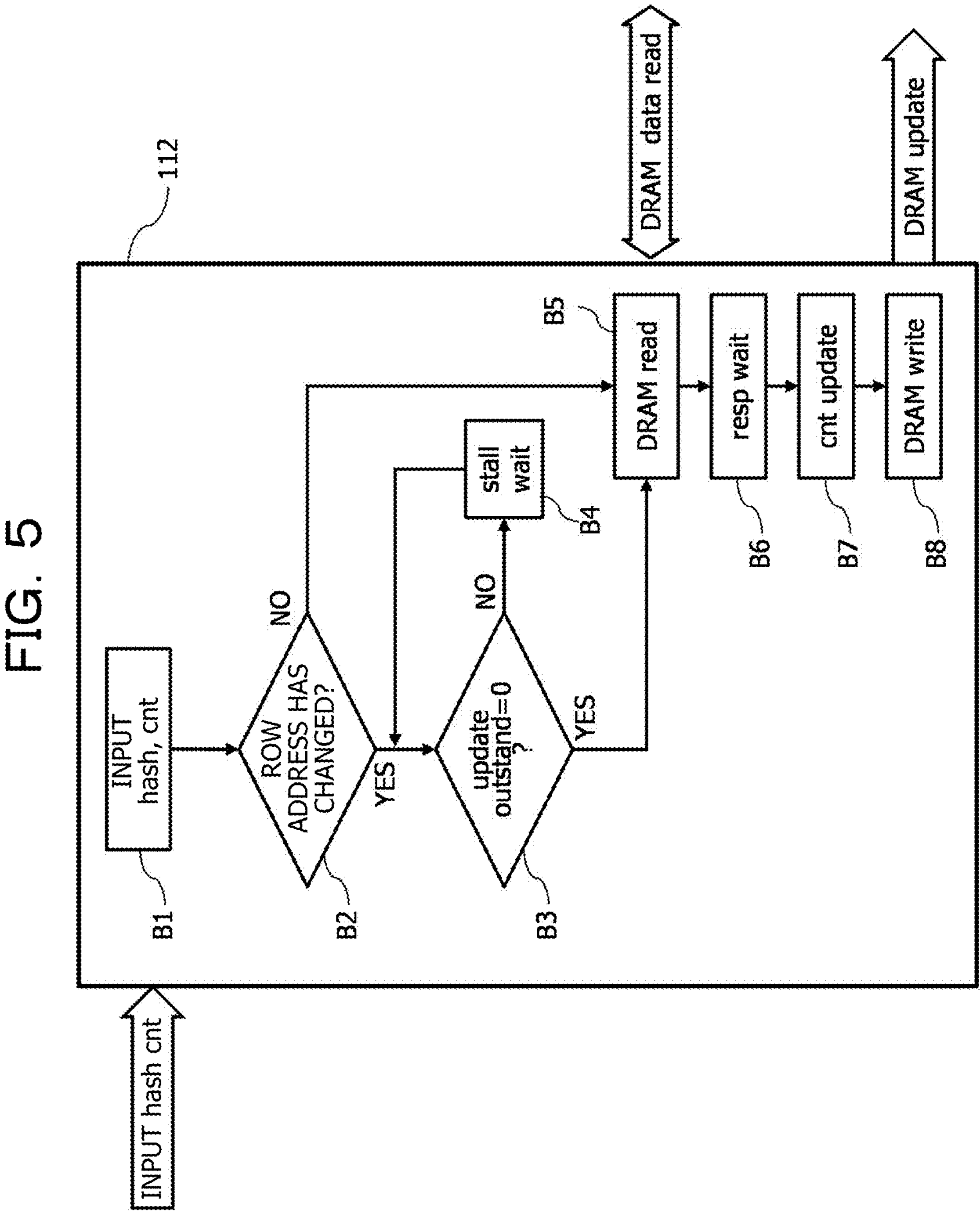
FIG. 5 is a flowchart for explaining functions of an update circuit in the virtual router that is an example of the embodiment.
Figure 6:
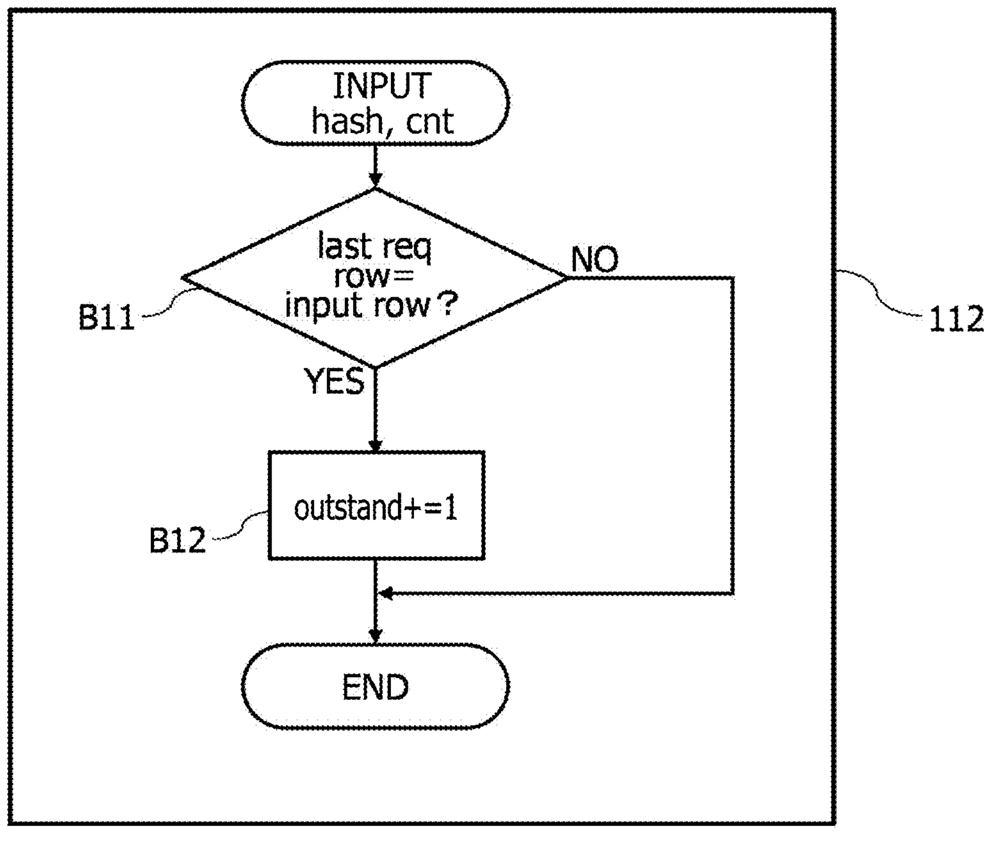
FIG. 6 is a flowchart for explaining functions of the update circuit in the virtual router that is an example of the embodiment.
Figure 7:
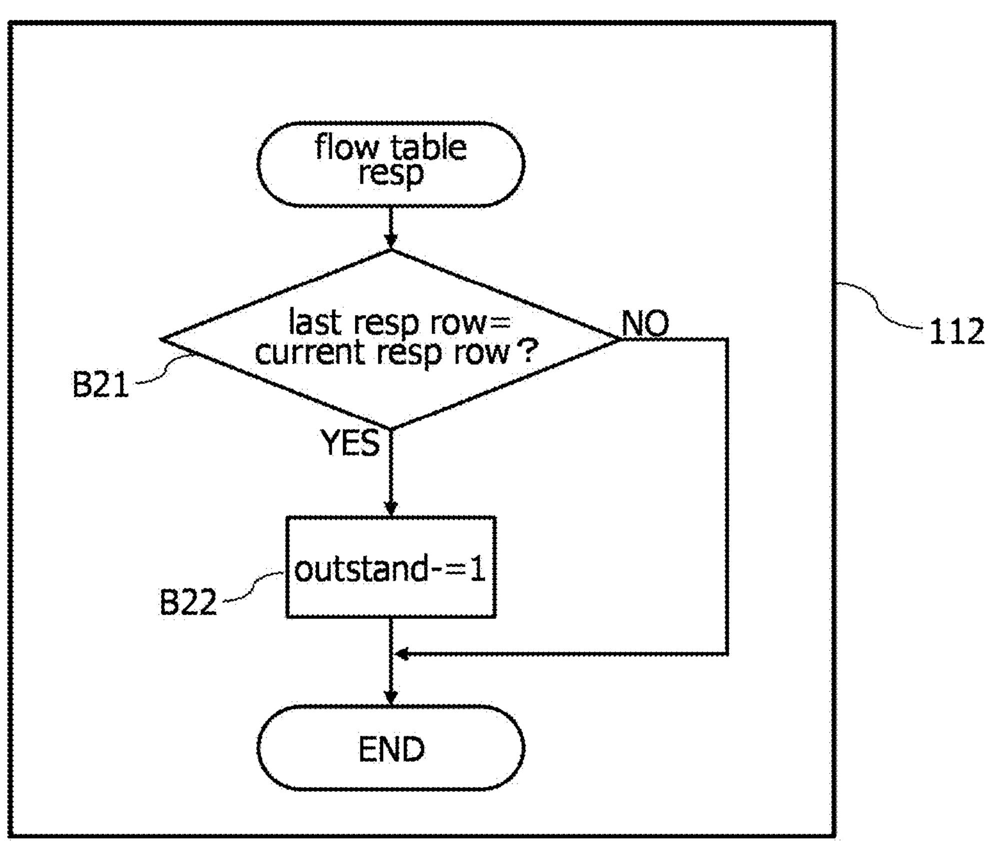
FIG. 7 is a flowchart for explaining functions of the update circuit in the virtual router that is an example of the embodiment.

FIGS. 5 to 7 are each a diagram for explaining a function of the update circuit 112 in the virtual router 1 that is an example of the embodiment.

FIGS. 5 to 7 illustrate processes (functions) of the update circuit 112 in a form of flowcharts (operations B1 to B8, B11 to B12, and B21 to B22).

First, a function of updating a counter of the flow table 101 by the update circuit 112 is described according to the flowchart illustrated in FIG. 5.

A hash value (hash) obtained by hashing the 5-tuple of a flow and a count value (cnt) of the flow read from the flow table 101 are inputted into the update circuit 112 (operation B1).

The update circuit 112 compares the ROW address of the newly-inputted flow and the ROW address of the flow processed in the last process, and checks whether there is a change in the ROW address (operation B2).

When there is no change in the ROW address (see NO route of operation B2), the process proceeds to operation B5.

In operation B5, the update circuit 112 issues a request for reading a count value of an entry specified by the hash value, to the flow table 101. The read request to the flow table 101 is synonymous with issuing a request for reading the count value of the entry specified by the hash value, to the on-board memory 5 (DRAM) that stores the information forming the flow table 101.

The update circuit 112 waits for a response of the count value from the flow table 101 (operation B6).

The update circuit 112 adds up the count value sent as a response from the flow table 101 and the count value (cnt) of the flow to be processed, and creates (calculates) an update count value (operation B7).

The update circuit 112 rewrites the count value of the corresponding entry in the flow table 101 by using the created update count value (perform update: operation B8). Writing of the count value to the flow table 101 is synonymous with writing the count value of the entry specified by the hash value to the on-board memory 5 (DRAM) that stores the information forming the flow table 101.

When the ROW address has been changed in the result of the check in operation B2 (see YES route of operation B2), the process proceeds to operation B3.

In operation B3, the update circuit 112 checks whether or not the count value outstand is 0. When the count value outstand is not 0 (see NO route of operation B3), the update circuit 112 stops the processing of the inputted flow (operation B4), and then returns to operation B3.

Meanwhile, when the count value outstand is 0 (see YES route of operation B3), the process proceeds to operation B5.

Next, a function of updating the count value outstand in the update circuit 112 is described according to the flowcharts illustrated in FIGS. 6 and 7.

The flowchart (operations B11 to B12) illustrated in FIG. 6 illustrates a process of counting up the value of the count value outstand, and the process is executed when a flow is inputted into the virtual router 1.

A hash value (hash) obtained by hashing the 5-tuple of a flow to be newly processed and a count value (cnt) of the flow read from the flow table 101 are inputted into the update circuit 112.

The update circuit 112 compares the ROW address of the flow to be newly processed and the ROW address of the flow processed in the last process, and checks whether the ROW addresses coincide with each other (last req row=input row?) (operation B11).

When the ROW address of the flow to be newly processed does not coincide with the ROW address of the flow processed in the last process (see NO route of operation B11), the process is terminated.

Meanwhile, when the ROW address of the flow to be newly processed coincides with the ROW address of the flow processed in the last process (see YES route of operation B11), the update circuit 112 adds (increments) "1" to the count value outstand (operation B12), and then terminates the process.

The flowchart (operations B21 to B22) illustrated in FIG. 7 illustrates a process of counting down the value of the count value outstand, and the process is executed when the count value is sent from the flow table 101 in response to the request for reading the count value issued to the flow table 101.

The update circuit 112 compares the ROW address of the flow table address corresponding to the count value sent as a response from the flow table 101 and the ROW address of the flow table address sent as a response from the flow table 101 in the last process, and checks whether the ROW addresses coincide with each other (last resp row=current resp row?) (operation B21).

When the ROW address of the flow table address corresponding to the count value sent as a response from the flow table 101 does not coincide with the ROW address of the flow table address sent as a response from the flow table 101 in the last process (see NO route of operation B21), the processing is terminated.

Meanwhile, when the ROW address of the flow table address corresponding to the count value sent as a response from the flow table 101 coincides with the ROW address of the flow table address sent as a response from the flow table 101 in the last process (see YES route of operation B21), the process proceeds to operation B22.

The update circuit 112 subtracts (decrements) "1" from the value of the count value outstand (operation B22), and then terminates the process.

Operation

Processes of the new registration check circuit 111 of the burst control circuit 106 in the virtual router 1 that is an example of the embodiment configured as described above are described with reference to FIGS. 8 to 14.

FIGS. 8 to 14 are diagrams illustrating transition of the processes by the new registration check circuit 111 in the burst control circuit 106, FIG. 8 illustrates an initial state (T=0), and FIGS. 9 to 14 illustrate states 1 to 5, respectively.

The example illustrated in FIGS. 8 to 14 illustrates an example in which flows are inputted into the virtual router 1 in the order of flow5, flow4, flow3, flow2, and flow1. It is assumed that the ROW address of flow5 is "aaac", the ROW address of flow4 is "bbbb", the ROW address of flow3 is "aaaa", the ROW address of flow2 is "dddd", and the ROW address of flow1 is "aaaa".

For example, among these flow1 to flow5, flow1 and flow3 have the same ROW address.

In an initial state (T=0), as illustrated in FIG. 8, no flow is registered in the ROW address management table 110.

Figure 9:
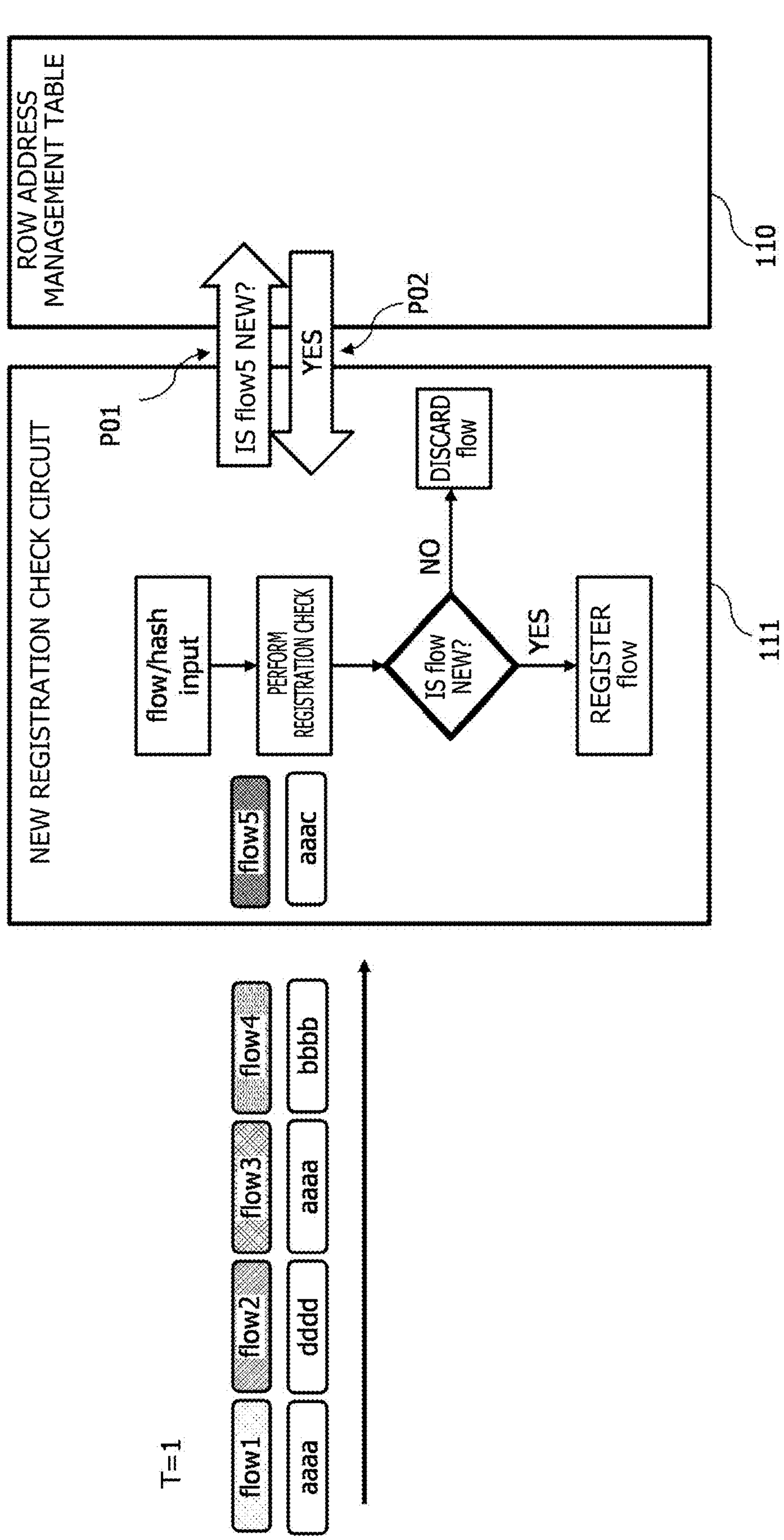
FIG. 9 is a diagram for explaining processes of the new registration check circuit of the burst control circuit in the virtual router that is an example of the embodiment.

In the state 1 (T=1), as illustrated in FIG. 9, flow5 is inputted into the new registration check circuit 111. The new registration check circuit 111 checks whether or not this flow5 is a new flow that is not registered in the ROW address management table 110 (see reference sign P01 in FIG. 9).

In the example illustrated in FIG. 9, the new registration check circuit 111 receives a response indicating that flow5 is not registered in the ROW address management table 110 (see reference sign P02 in FIG. 9).

Figure 10:
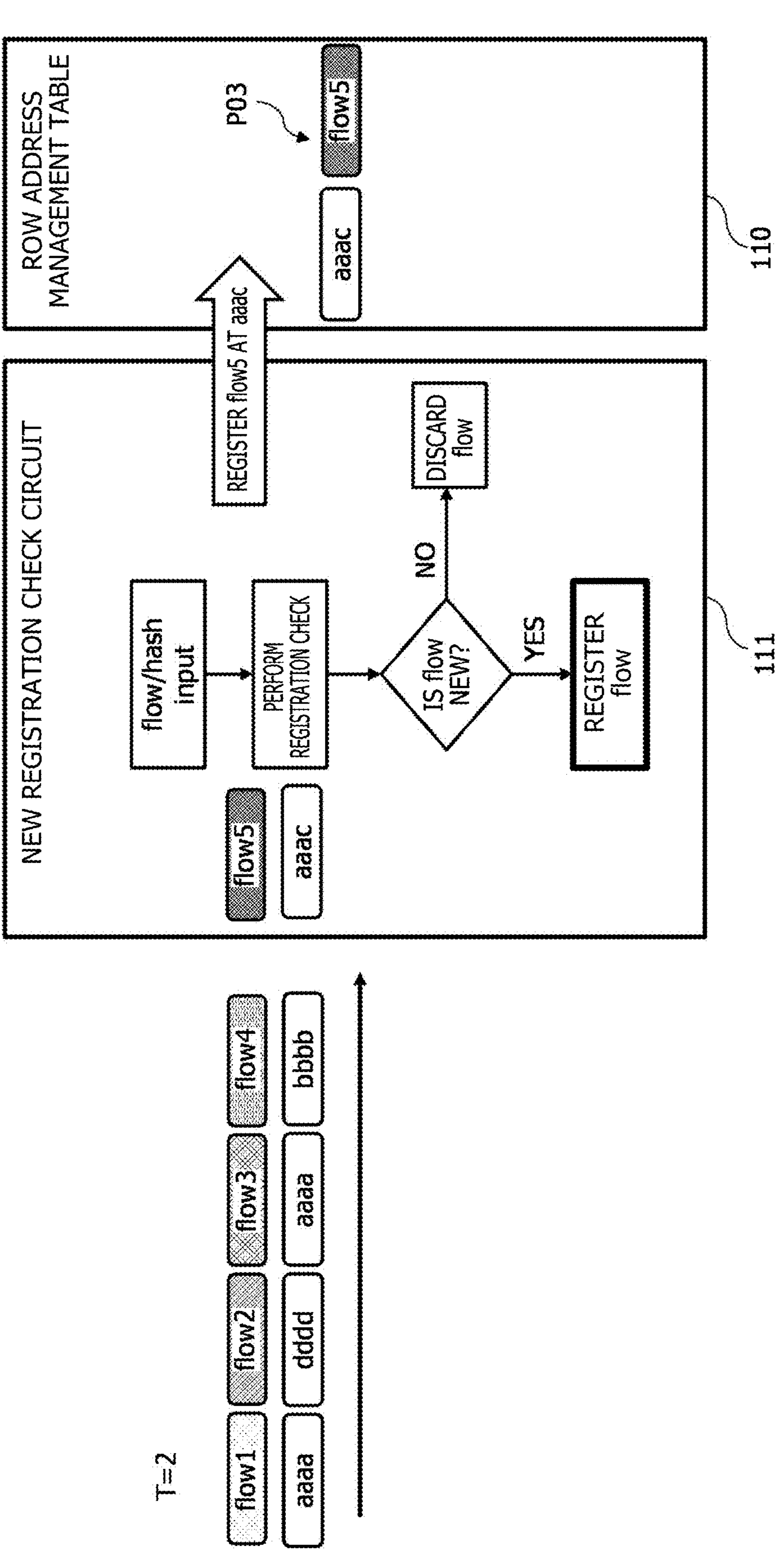
FIG. 10 is a diagram for explaining processes of the new registration check circuit of the burst control circuit in the virtual router that is an example of the embodiment.

In the state 2 (T=2), as illustrated in FIG. 10, the new registration check circuit 111 registers flow5 in the ROW address management table 110 in association with the ROW address "aaac" of flow5 (see reference sign P03 in FIG. 10).

In the state 3 (T=3) to the state 5 (T=5), the new registration check circuit 111 sequentially performs processes of checking whether flow4, flow3, and flow2 are not registered in the ROW address management table 110 and registering flow4, flow3, and flow2 in the ROW address management table 110 as in the aforementioned states 1 and 2.

Figure 11:
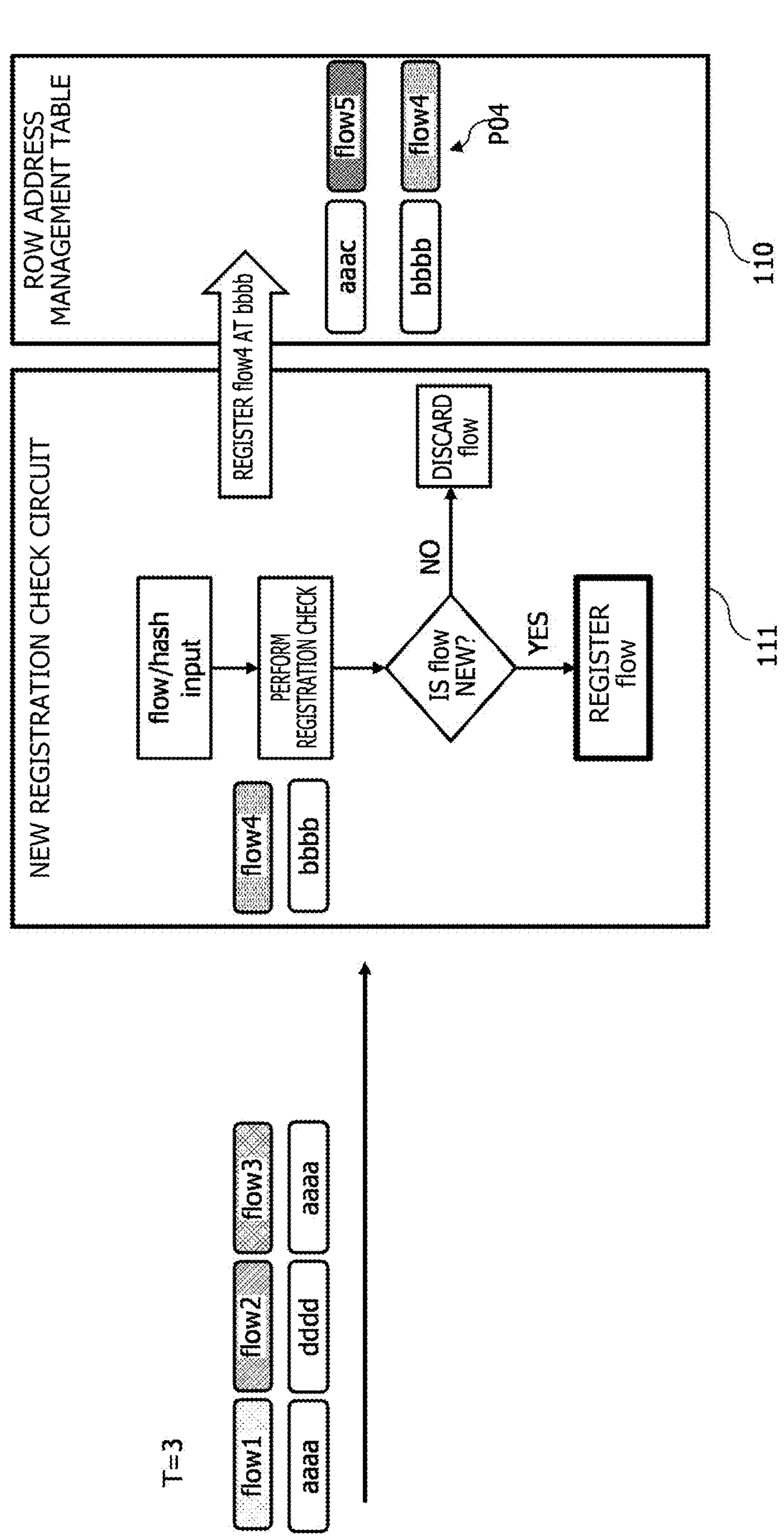
FIG. 11 is a diagram for explaining processes of the new registration check circuit of the burst control circuit in the virtual router that is an example of the embodiment.

In the state 3 (T=3), as illustrated in FIG. 11, the new registration check circuit 111 registers flow4 in the ROW address management table 110 in association with the ROW address "bbbb" of flow4 (see reference sign P04 in FIG. 11).

Figure 12:
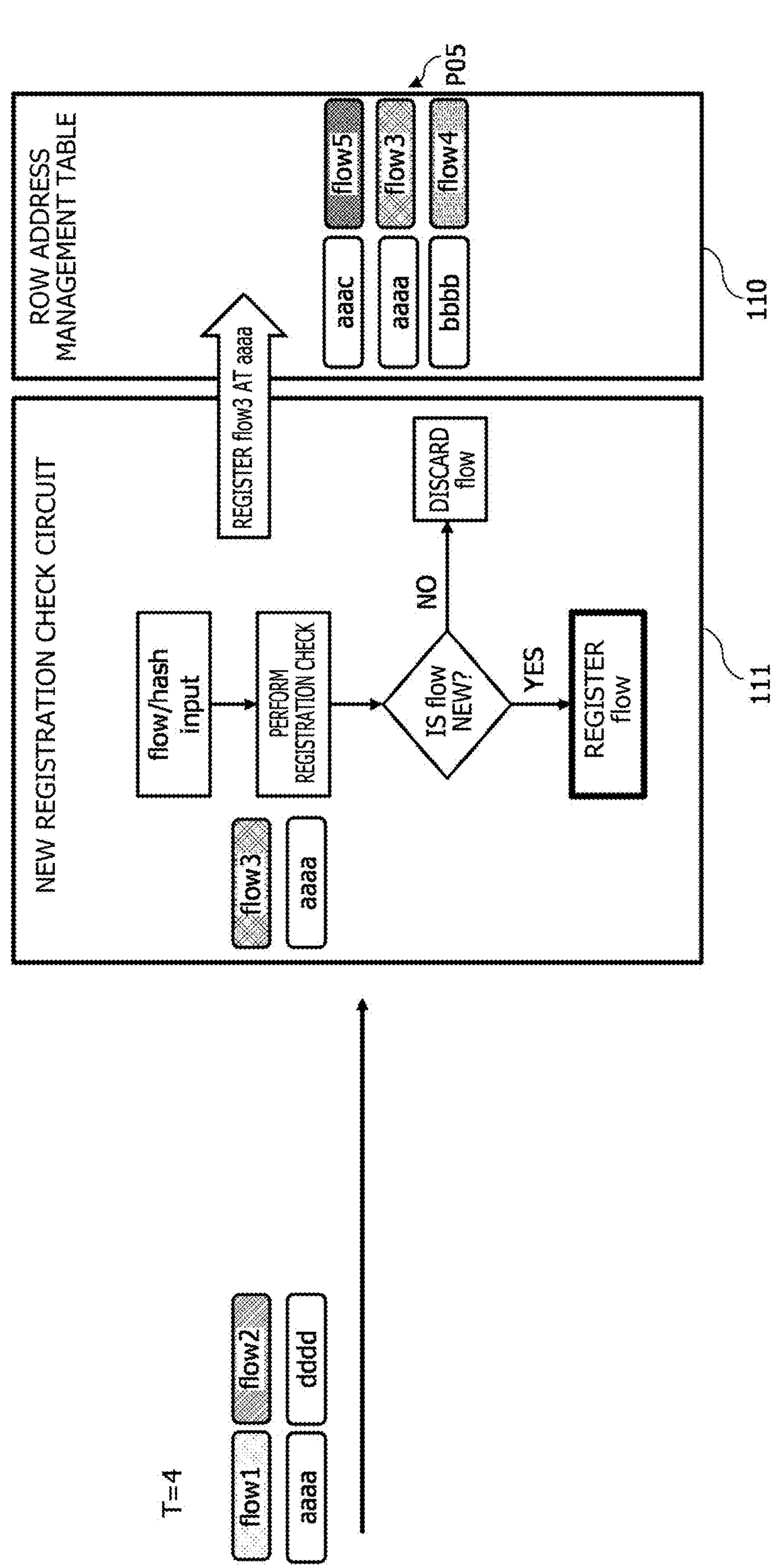
FIG. 12 is a diagram for explaining processes of the new registration check circuit of the burst control circuit in the virtual router that is an example of the embodiment.

In the state 4 (T=4), as illustrated in FIG. 12, the new registration check circuit 111 registers flow3 in the ROW address management table 110 in association with the ROW address "aaaa" of flow3 (see reference sign P05 in FIG. 12).

Figure 13:
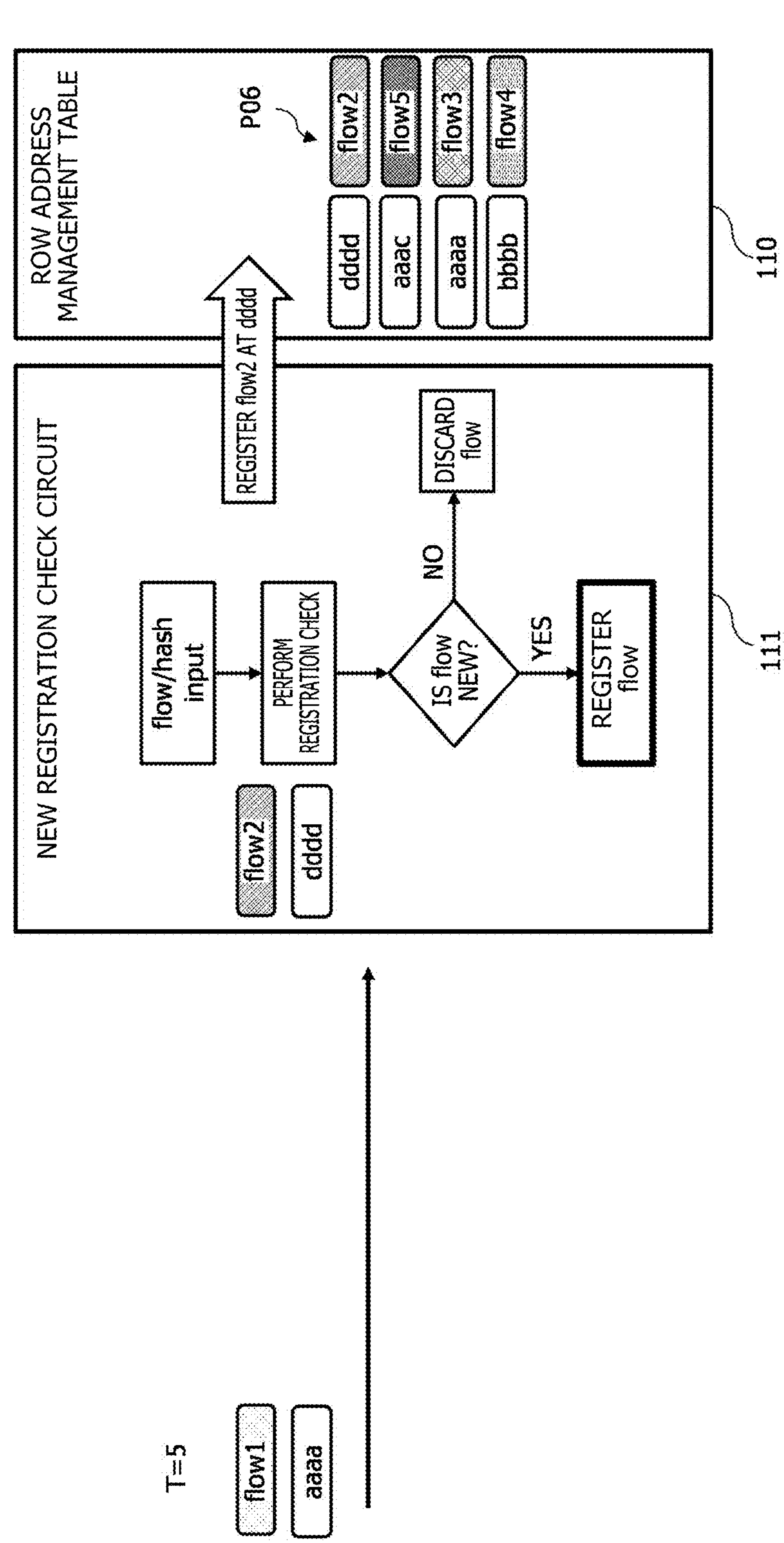
FIG. 13 is a diagram for explaining processes of the new registration check circuit of the burst control circuit in the virtual router that is an example of the embodiment.

In the state 5 (T=5), as illustrated in FIG. 13, the new registration check circuit 111 registers flow2 in the ROW address management table 110 in association with the ROW address "dddd" of flow2 (see reference sign P06 in FIG. 13).

Figure 14:
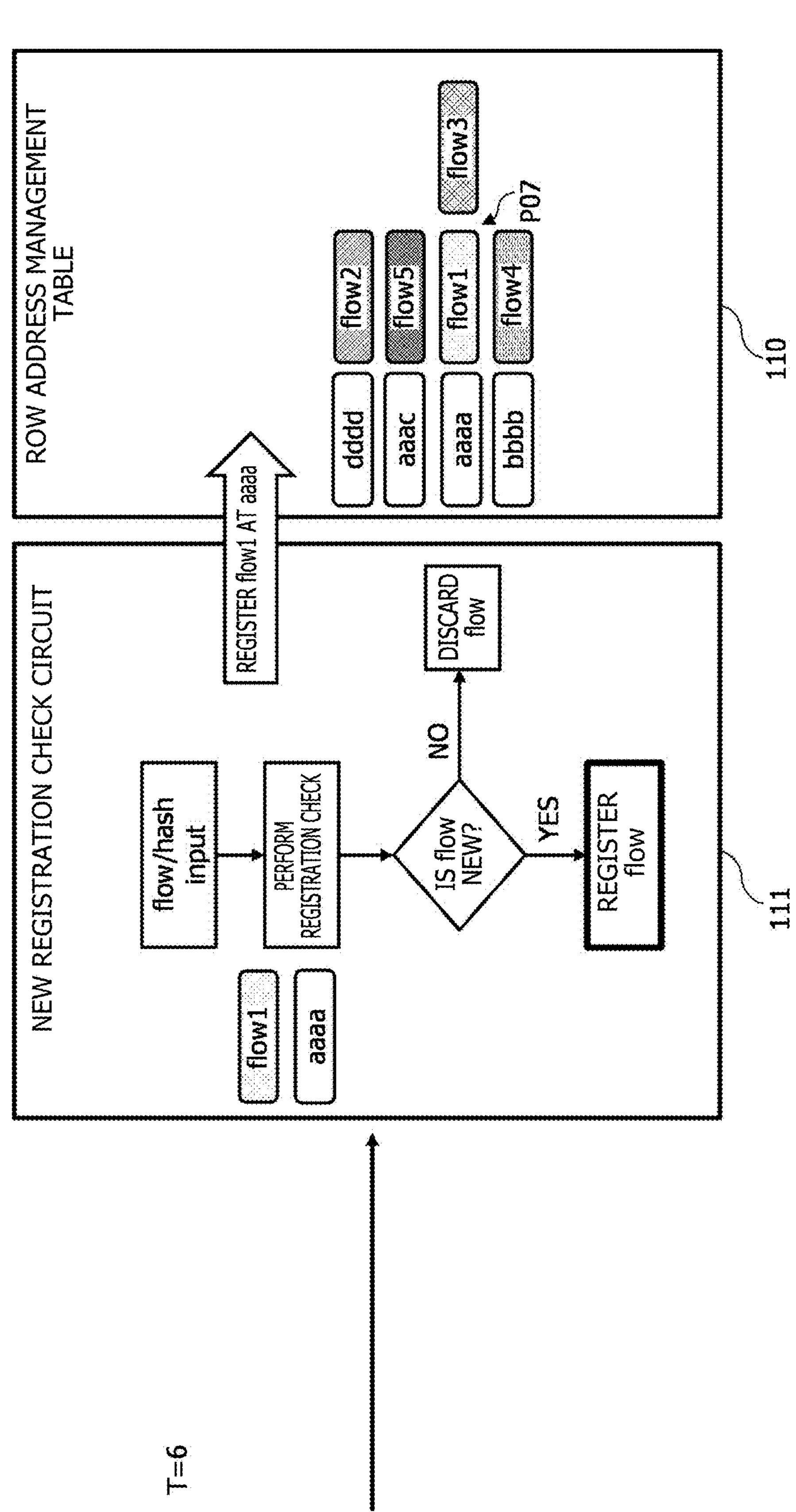
FIG. 14 is a diagram for explaining processes of the new registration check circuit of the burst control circuit in the virtual router that is an example of the embodiment.

In the state 6 (T=6), as illustrated in FIG. 14, the new registration check circuit 111 registers flow1 in the ROW address management table 110 in association with the ROW address "aaaa" of flow1 (see reference sign P07 in FIG. 14). In this case, since flow3 is registered in advance in association with the ROW address "aaaa" in the ROW address management table 110, two flows of flow3 and flow1 are associated with the ROW address "aaaa". For example, in the ROW address management table 110, flow3 and flow1 having the same ROW address "aaaa" are managed as a group.

Next, processes of the update circuit 112 of the burst control circuit 106 in the virtual router 1 that is an example of the embodiment are described with reference to FIGS. 15 to 26.

Figure 15:
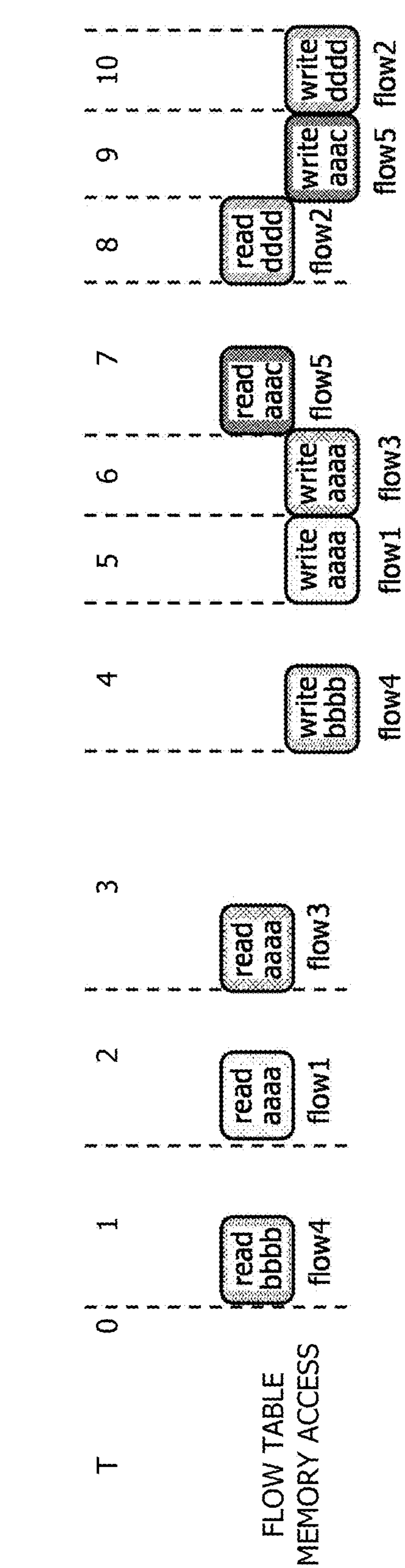
FIG. 15 is a diagram for explaining processes of the update circuit of the burst control circuit in the virtual router that is an example of the embodiment.

FIG. 15 illustrates memory access (flow table memory access) that occurs in processes performed on the flow table 101 by the flow update circuit 112 for multiple types (five types of flow1 to flow5 in the example illustrated in FIG. 15) of flows.

In FIGS. 15 to 26 described below, the update circuit 112 performs a process in the flow table memory access order illustrated in FIG. 15. For example, as illustrated in FIG. 15, it is assumed that the update circuit 112 processes the multiple flows registered in the ROW address management table 110 in the order of flow4, flow1, flow3, flow4, flow1, flow3, flow5, flow2, flow5, and flow2.

Figure 16:
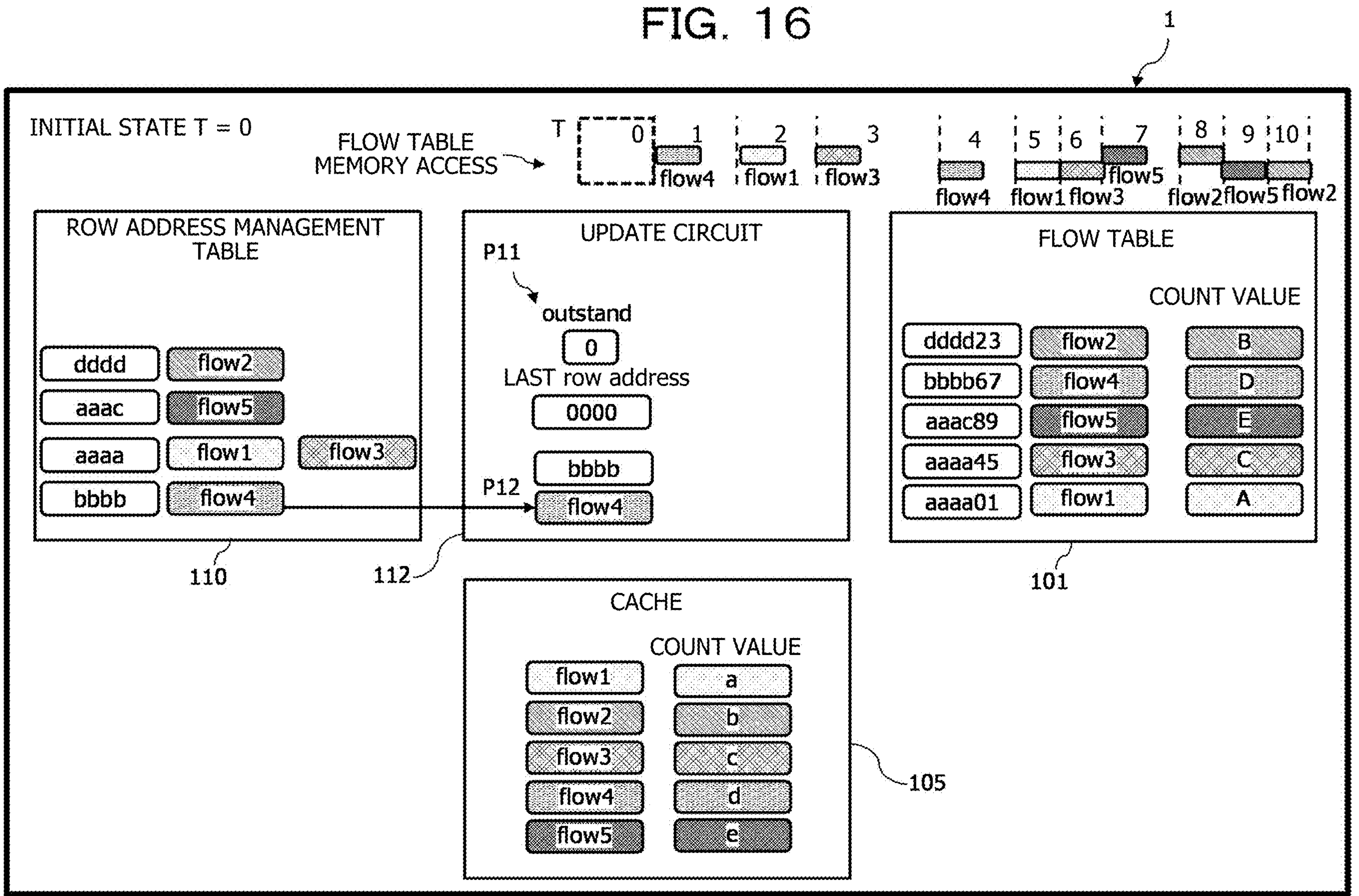
FIG. 16 is a diagram for explaining processes of the update circuit of the burst control circuit in the virtual router that is an example of the embodiment.

FIGS. 16 to 26 are diagrams illustrating transition of the processes by the update circuit 112 in the burst control circuit 106, FIG. 16 illustrates an initial state (T=0), and FIGS. 17 to 26 illustrate states 1 to 10, respectively. For convenience, in the upper part of each of FIGS. 16 to 26, the flow table memory access is illustrated, and which one of the states T=0 to T=10 of the flow table memory access each drawing is in is illustrated by surrounding the corresponding state with a rectangular broken line.

As in the example illustrated in FIGS. 8 to 14, it is assumed that the ROW address of flow5 is "aaac", the ROW address of flow4 is "bbbb", the ROW address of flow3 is "aaaa", the ROW address of flow2 is "dddd", and the ROW address of flow1 is "aaaa". For example, among these flow1 to flow5, flow1 and flow3 have the same ROW address.

In the initial state (T=0), as illustrated in FIG. 16, the count value outstand and the value of the last ROW address are each "0" (see reference sign P11 in FIG. 16).

In the initial state illustrated in FIG. 16, the ROW address management table 110 is in the same state as the ROW address management table 110 for which the new registration check circuit 111 performed the registration in FIG. 14.

In the initial state illustrated in FIG. 16, flow1 to flow5 are registered in the flow table 101. For example, in the flow table 101 illustrated in FIG. 16, flow2 is registered at a flow table address "dddd23", and "B" is registered as the count value of this flow2.

In the cache 105 illustrated in FIG. 16, flow1 to flow5 are registered together with the respective count values thereof. For example, in the cache 105 illustrated in FIG. 16, the count value "a" is registered in association with flow1.

The update circuit 112 receives flow4 and the ROW address thereof from the ROW address management table 110 (see reference sign P12 in FIG. 16). This process corresponds to operation B1 in the flowchart illustrated in FIG. 5.

In the state 1 (T=1), the update circuit 112 compares the ROW address "bbbb" of flow4 with the last ROW address "0000". This process corresponds to operation B2 in the flowchart illustrated in FIG. 5. Since the ROW addresses do not coincide with each other in the result of the comparison, the update circuit 112 then determines whether the count value outstand is 0. This process corresponds to operation B3 in the flowchart illustrated in FIG. 5.

Figure 17:
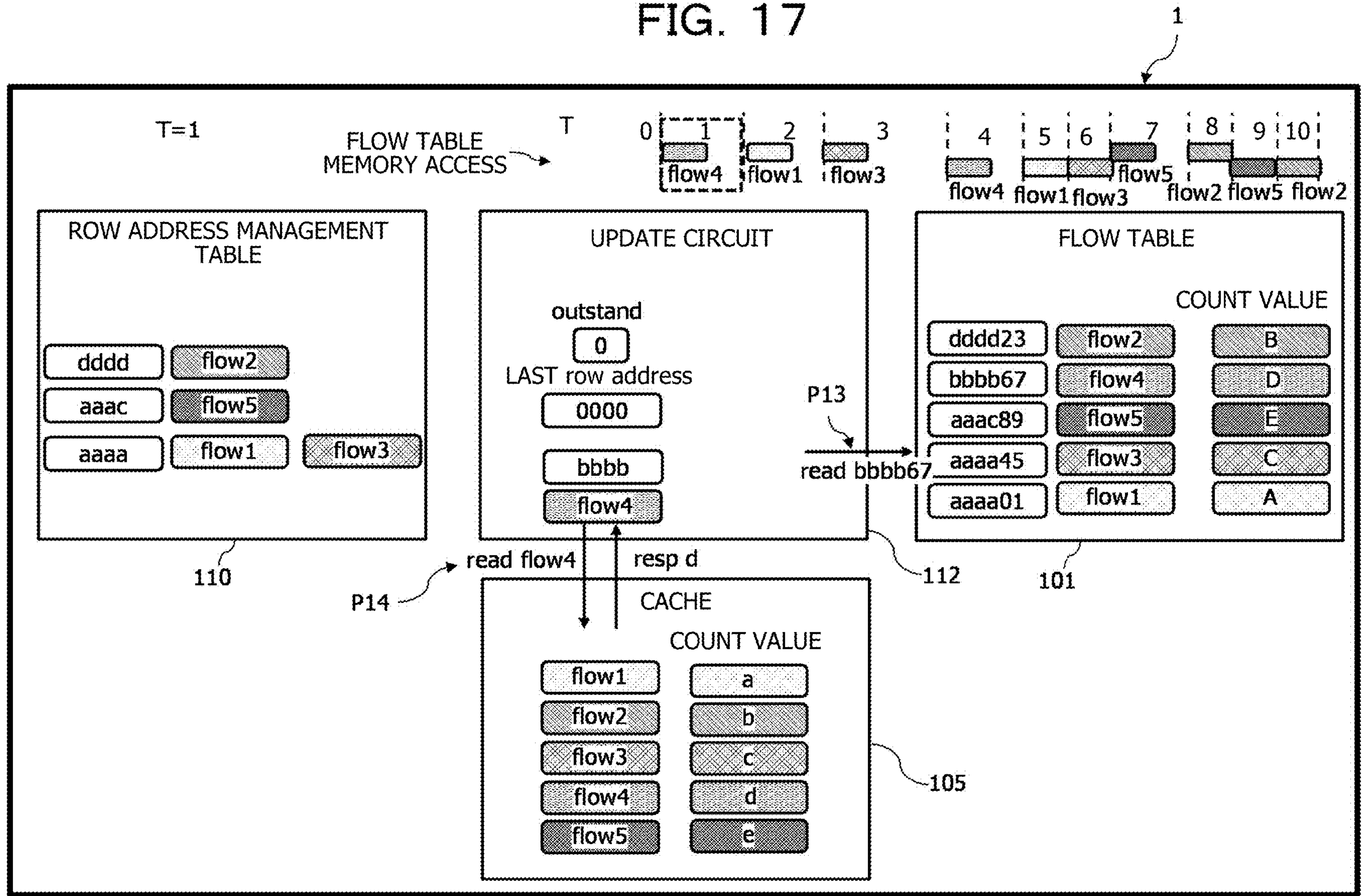
FIG. 17 is a diagram for explaining processes of the update circuit of the burst control circuit in the virtual router that is an example of the embodiment.

Since the count value outstand is 0, the update circuit 112 issues a read request for reading the count value of the flow table address "bbbb67" of flow4, to the flow table 101 (read bbbb67; see reference sign P13 in FIG. 17). This process corresponds to operation B5 in the flowchart illustrated in FIG. 5.

The update circuit 112 reads the count value "d" of flow4 from the cache 105 (see reference sign P14 in FIG. 17).

In the state 2 (T=2), the update circuit 112 compares the ROW address "aaaa" of next flow1 with the last ROW address "bbbb". This process corresponds to operation B2 in the flowchart illustrated in FIG. 5. Since the ROW addresses do not coincide with each other in the result of the comparison, the update circuit 112 then determines whether the count value outstand is 0. This process corresponds to operation B3 in the flowchart illustrated in FIG. 5.

Figure 18:
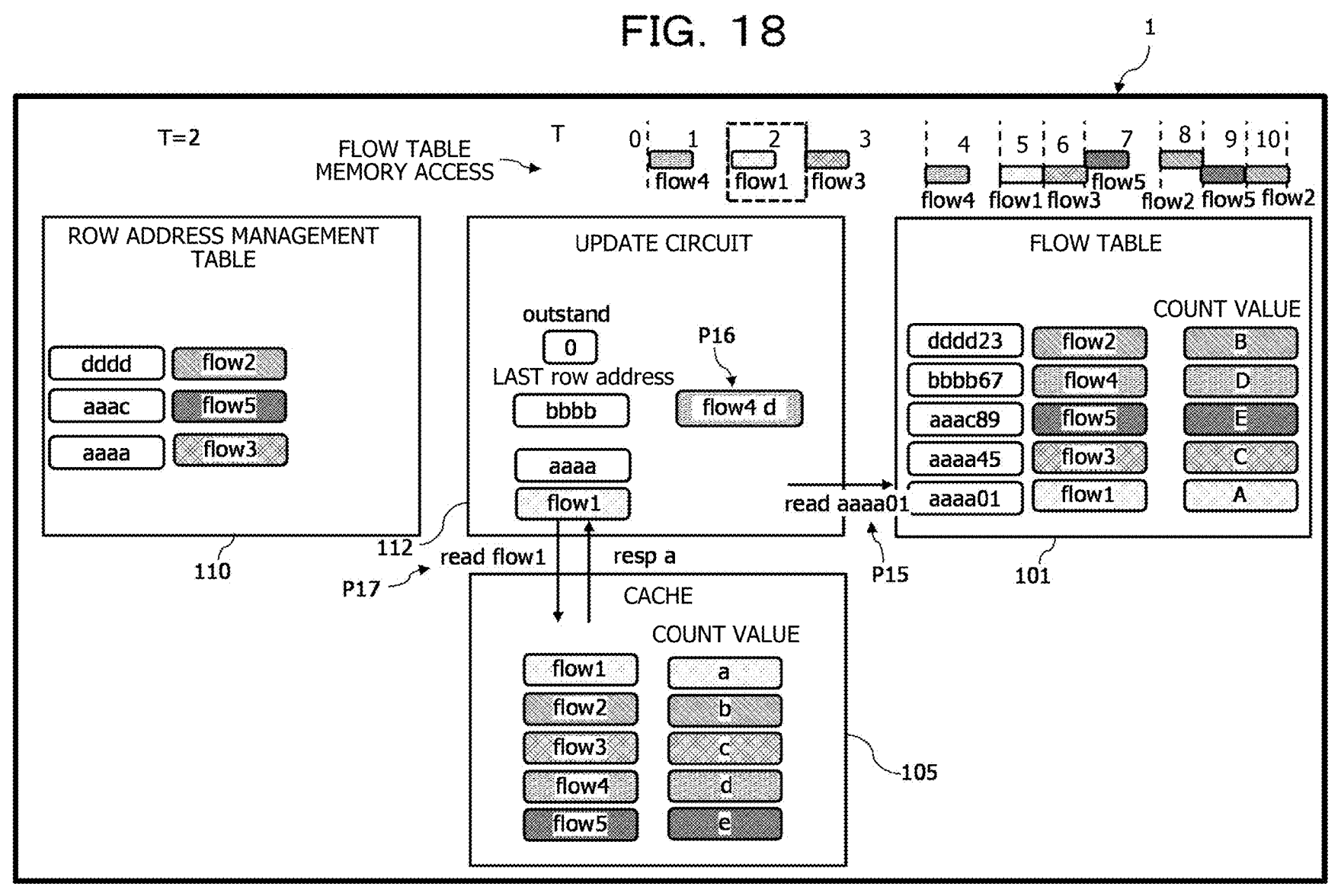

Since the count value outstand is 0, the update circuit 112 issues a read request for reading the count value of the flow table address "aaaa01" of flow1, to the flow table 101 (read aaaa01; see reference sign P15 in FIG. 18). This process corresponds to operation B5 in the flowchart illustrated in FIG. 5.

The count value "d" of flow4 read from the cache 105 is held in the update circuit 112 (see a reference sign P16 in FIG. 18).

The update circuit 112 reads the count value "a" of flow1 from the cache 105 (see reference sign P17 in FIG. 18).

In the state 3 (T=3), the update circuit 112 compares the ROW address "aaaa" of next flow3 with the last ROW address "aaaa". This process corresponds to operation B2 in the flowchart illustrated in FIG. 5. Since the ROW addresses coincide with each other in the result of the comparison, the update circuit 112 issues a read request for reading the count value of the flow table address "aaaa45" of flow3 to the flow table 101 (read aaaa45; see reference sign P18 in FIG. 19). This process corresponds to operation B5 in the flowchart illustrated in FIG. 5.

Since flow1 and flow3 have the same ROW address, no delay (penalty) occurs in access to the flow table 101.

The count value "a" of flow1 read from the cache 105 is held in the update circuit 112 (see reference sign P19 in FIG. 19).

The update circuit 112 reads the count value "c" of flow3 from the cache 105 (see reference sign P20 in FIG. 19).

Since the ROW address "aaaa" of flow3 and the last ROW address "aaaa" coincide with each other, the update circuit 112 adds (increments) 1 to the value of the count value outstand. The process of updating the count value of the flow table 101 by the update circuit 112 is thereby stalled.

Figure 20:
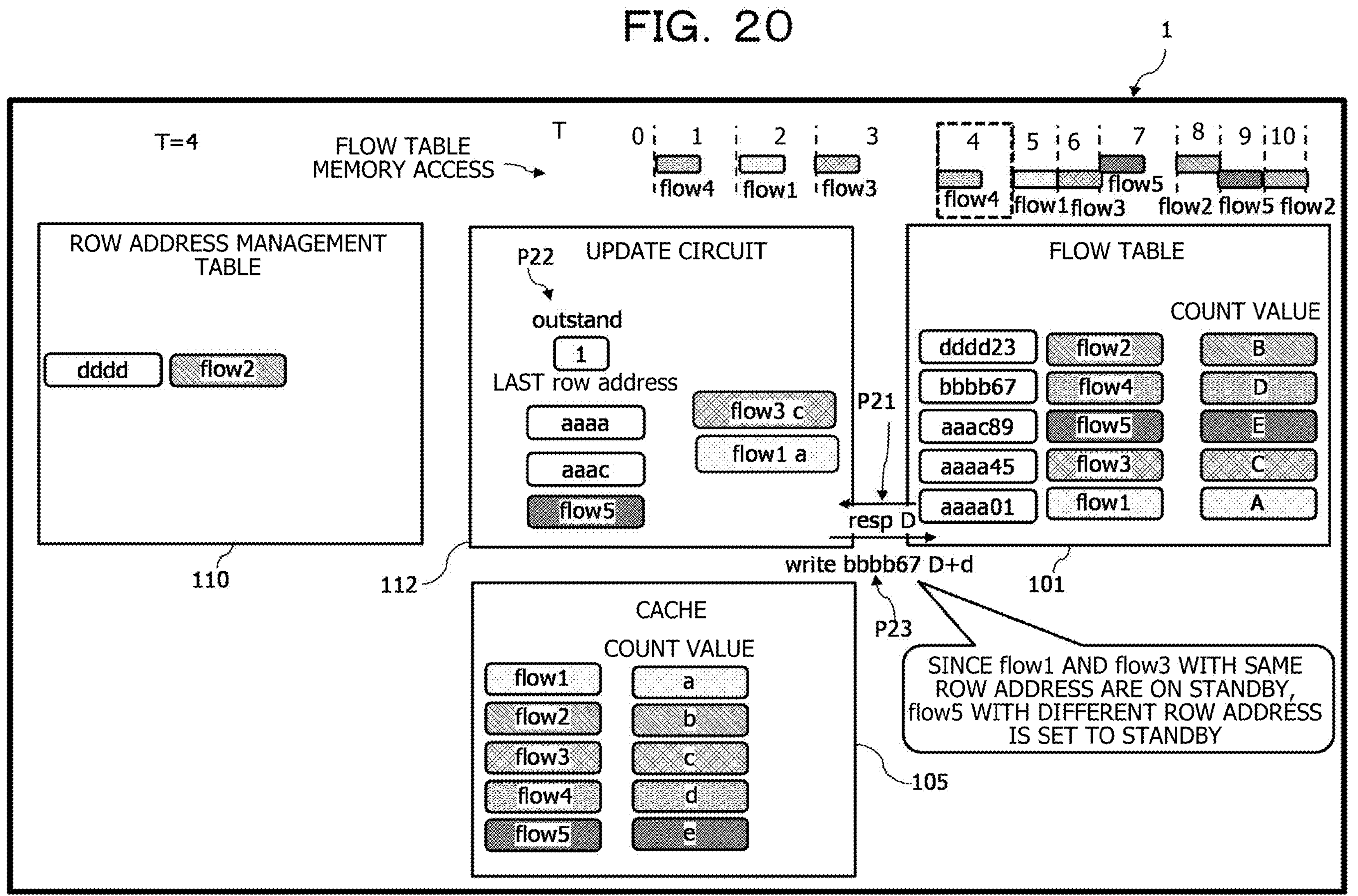
FIG. 20 is a diagram for explaining processes of the update circuit of the burst control circuit in the virtual router that is an example of the embodiment.

In the state 4 (T=4), the count value "D" of flow4 is sent from the flow table 101 to the update circuit 112 in response to the read request made in the state 1 (T=1) (see reference sign P21 in FIG. 20).

The update circuit 112 compares the ROW address "aaac" of next flow5 with the last ROW address "aaaa". This process corresponds to operation B2 in the flowchart illustrated in FIG. 5. Since the ROW addresses do not coincide with each other in the result of the comparison, the update circuit 112 then determines whether the count value outstand is 0. This process corresponds to operation B3 in the flowchart illustrated in FIG. 5. Since the count value outstand is 1, the update circuit 112 is on standby while stalling the process for flow5 (memory access to the on-board memory 5). This process corresponds to operation B4 in the flowchart illustrated in FIG. 5.

The update circuit 112 issues a write request (write bbbb67 D+d) for writing a value "D+d", obtained by adding a count value "d" read from the cache 105 to the count value "D" of flow4 sent as a response from the flow table 101, to the flow table address "bbbb67" in the flow table 101 (see reference sign P23 in FIG. 20). This process corresponds to operations B7 and B8 in the flowchart illustrated in FIG. 5.

Figure 21:
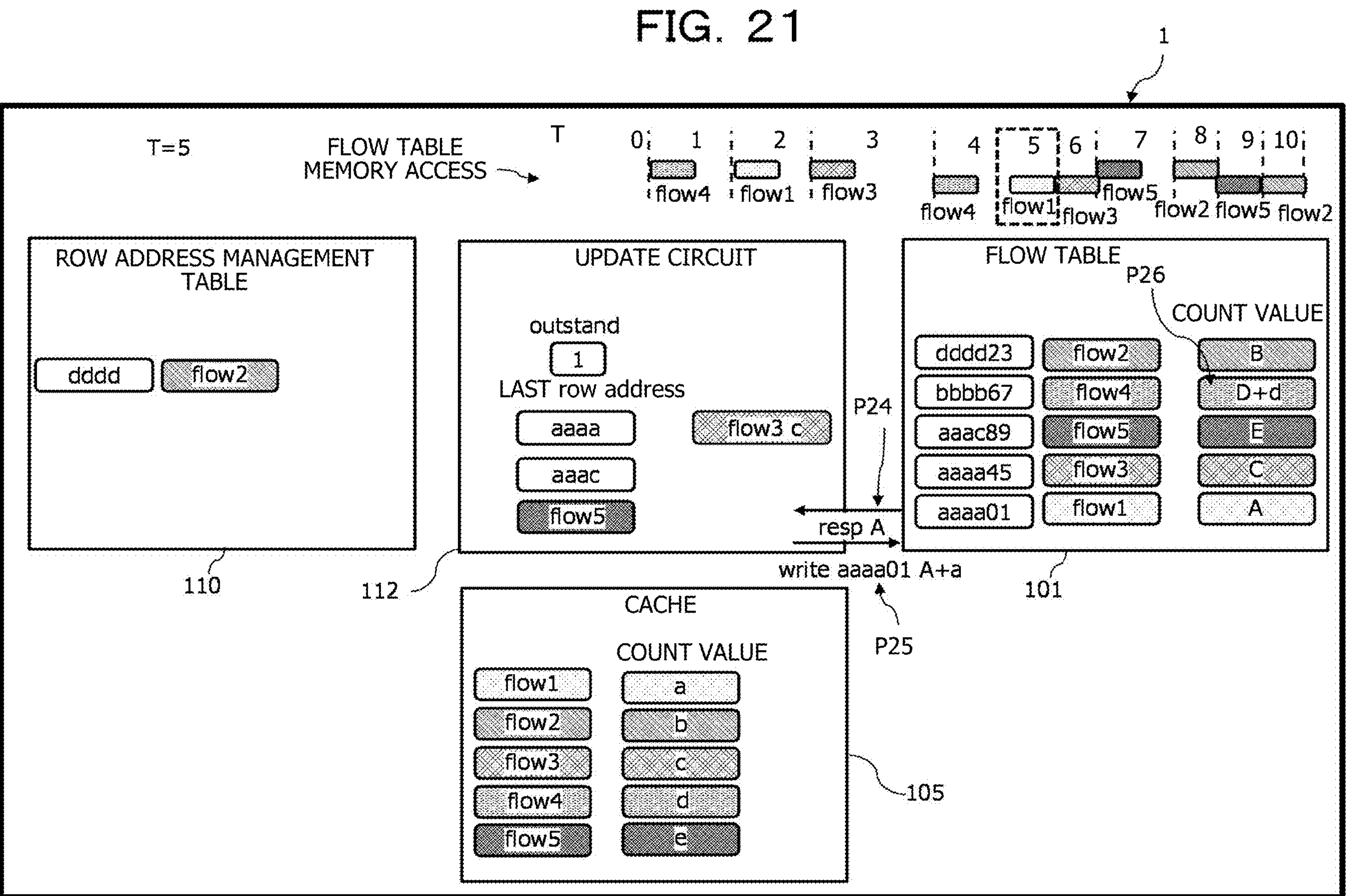
FIG. 21 is a diagram for explaining processes of the update circuit of the burst control circuit in the virtual router that is an example of the embodiment.

In the state 5 (T=5), the count value "A" of flow1 is sent from the flow table 101 to the update circuit 112 in response to the read request made in the state 2 (T=2) (see reference sign P24 in FIG. 21).

The update circuit 112 issues a write request (write aaaa01 A+a) for writing a value "A+a", obtained by adding a count value "a" read from the cache 105 to the count value "A" of flow1 sent as a response from the flow table 101, to the flow table address "aaaa01" in the flow table 101 (see reference sign P25 in FIG. 21). This process corresponds to operations B7 and B8 in the flowchart illustrated in FIG. 5.

In the flow table 101, the count value of flow4 is updated to "D+d" (see reference sign P26 in FIG. 21).

Also in the state 5, the update circuit 112 maintains the standby state without processing flow5.

In the state 6 (T=6), the count value "C" of flow3 is sent from the flow table 101 to the update circuit 112 in response to the read request made in the state 3 (T=3) (see reference sign P27 in FIG. 22).

The update circuit 112 issues a write request (write aaaa45 C+c) for writing a value "C+c", obtained by adding a count value "c" read from the cache 105 to the count value "C" of flow3 sent as a response from the flow table 101, to the flow table address "aaaa45" in the flow table 101 (see reference sign P28 in FIG. 22). This process corresponds to operations B7 and B8 in the flowchart illustrated in FIG. 5.

Since flow1 and flow3 have the same ROW address, no delay (penalty) occurs in access to the flow table 101.

The count value "A" of flow1 sent as a response from the flow table 101 to the update circuit 112 in the state 5 and the count value "C" of flow3 sent as a response from the flow table 101 to the update circuit 112 in the state 6 correspond to the same ROW address.

Accordingly, the update circuit 112 subtracts 1 from the count value outstand. The count value outstand thus becomes 0 (see reference sign P30 in FIG. 22), and the process of updating the count value of the flow table 101 by the update circuit 112, which has been stalled, is resumed.

In the state 7 (T=7), the update circuit 112 compares the ROW address "aaac" of flow5 with the last ROW address "aaaa". This process corresponds to operation B2 in the flowchart illustrated in FIG. 5. Since the ROW addresses do not coincide with each other in the result of the comparison, the update circuit 112 then determines whether the count value outstand is 0. This process corresponds to operation B3 in the flowchart illustrated in FIG. 5.

Figure 23:
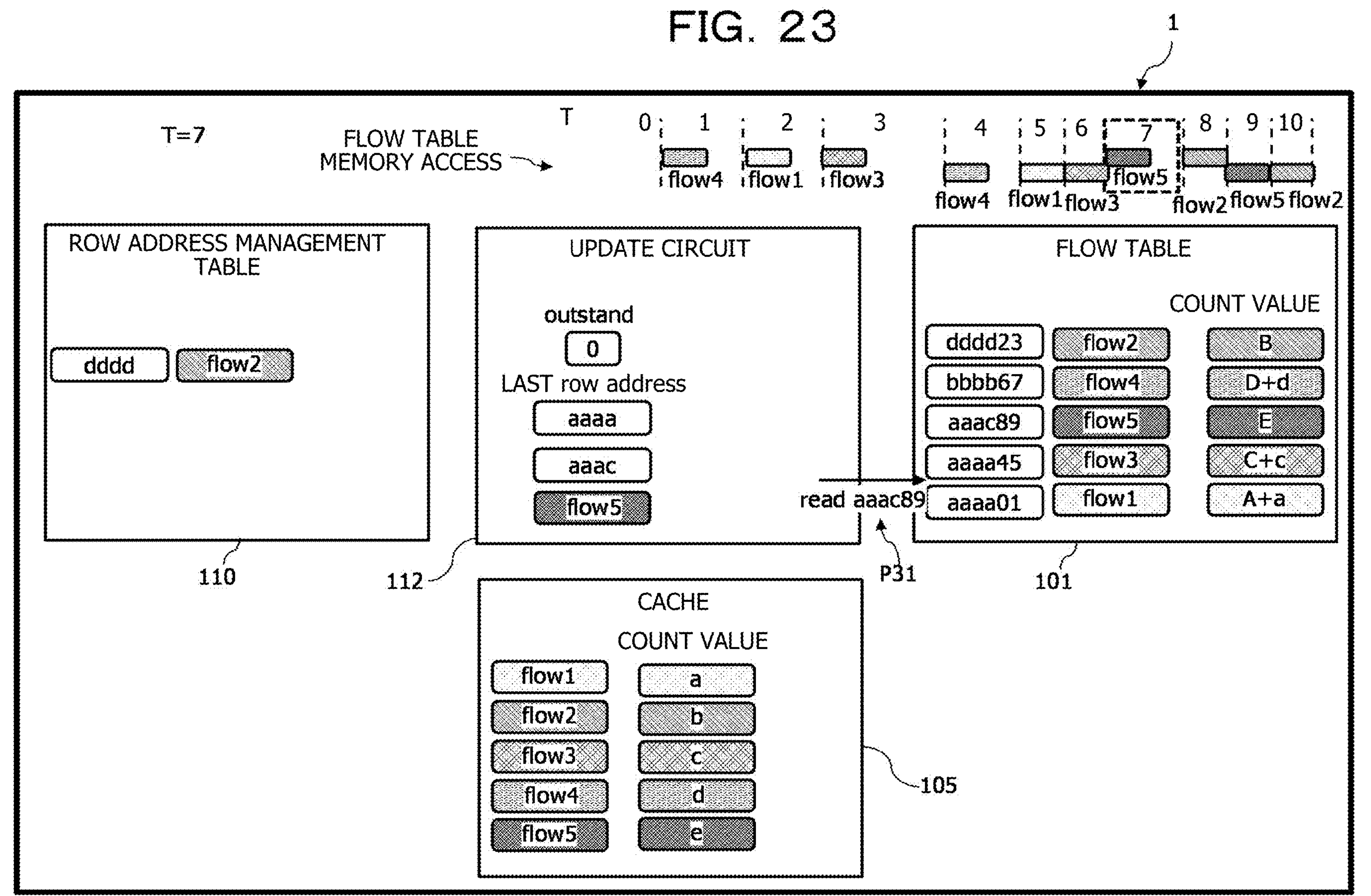
FIG. 23 is a diagram for explaining processes of the update circuit of the burst control circuit in the virtual router that is an example of the embodiment.

Since the count value outstand is 0, the update circuit 112 issues a read request for reading the count value of the flow table address "aaac89" of flow5, to the flow table 101 (read aaac89; see reference sign P31 in FIG. 23). This process corresponds to operation B5 in the flowchart illustrated in FIG. 5.

In the state 8 (T=8), the update circuit 112 compares the ROW address "dddd" of flow2 with the last ROW address "aaac". This process corresponds to operation B2 in the flowchart illustrated in FIG. 5. Since the ROW addresses do not coincide with each other in the result of the comparison, the update circuit 112 then determines whether the count value outstand is 0. This process corresponds to operation B3 in the flowchart illustrated in FIG. 5.

Figure 24:
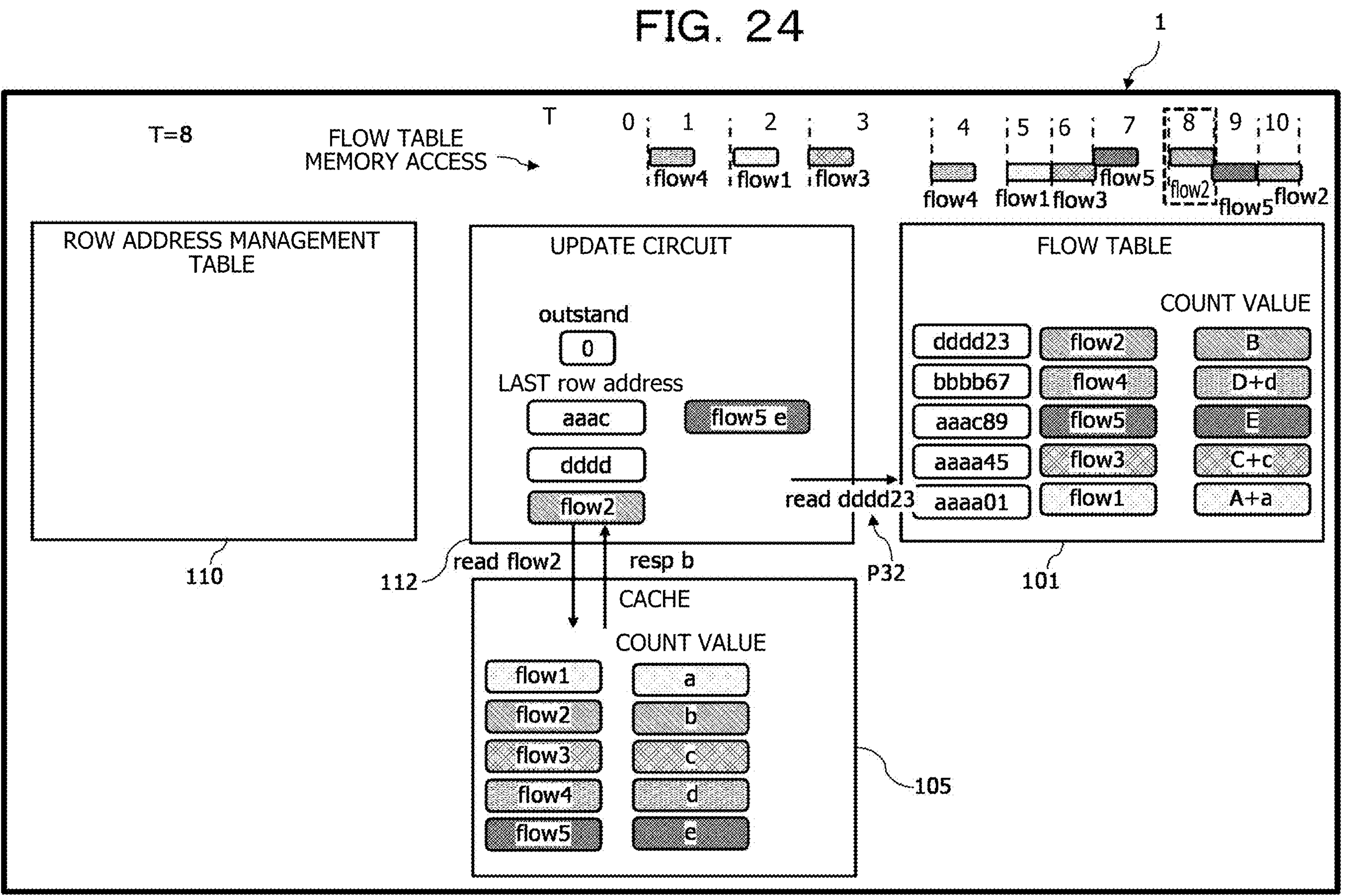
FIG. 24 is a diagram for explaining processes of the update circuit of the burst control circuit in the virtual router that is an example of the embodiment.

Since the count value outstand is 0, the update circuit 112 issues a read request for reading the count value of the flow table address "dddd23" of flow2, to the flow table 101 (read dddd23; see reference sign P32 in FIG. 24). This process corresponds to operation B5 in the flowchart illustrated in FIG. 5.

Figure 25:
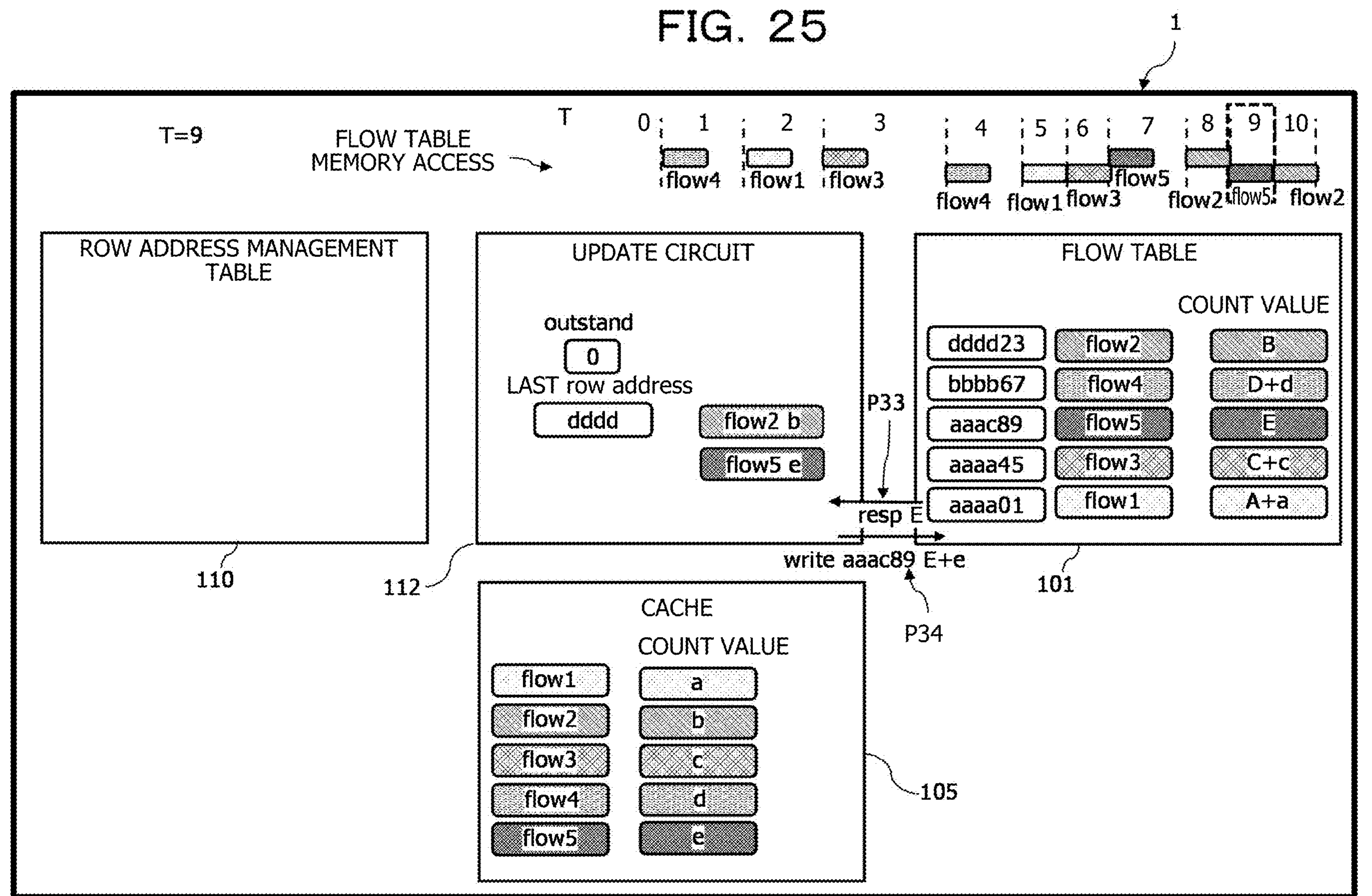
FIG. 25 is a diagram for explaining processes of the update circuit of the burst control circuit in the virtual router that is an example of the embodiment.

In the state 9 (T=9), the count value "E" of flow5 is sent from the flow table 101 to the update circuit 112 in response to the read request made in the state 7 (T=7) (see reference sign P33 in FIG. 25).

The update circuit 112 issues a write request (write aaac89 E+e) for writing a value "E+e", obtained by adding a count value "e" read from the cache 105 to the count value "E" of flow5 sent as a response from the flow table 101, to the flow table address "aaac89" in the flow table 101 (see reference sign P34 in FIG. 25). This process corresponds to operations B7 and B8 in the flowchart illustrated in FIG. 5.

Figure 26:
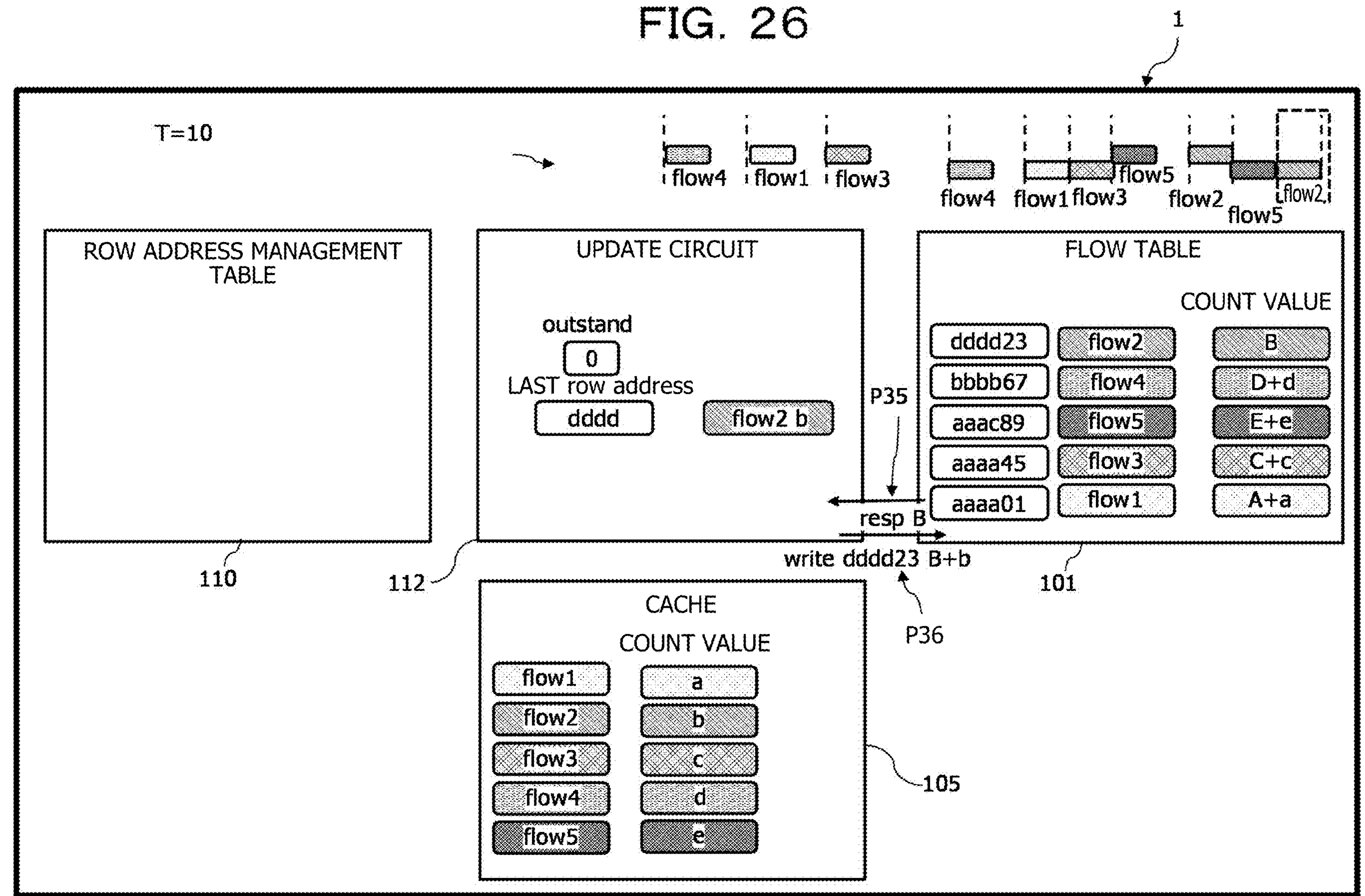
FIG. 26 is a diagram for explaining processes of the update circuit of the burst control circuit in the virtual router that is an example of the embodiment.

In the state 10 (T=10), the count value "B" of flow2 is sent from the flow table 101 to the update circuit 112 in response to the read request made in the state 8 (T=8) (see reference sign P35 in FIG. 26).

The update circuit 112 issues a write request (write dddd23 B+b) for writing a value "B+b", obtained by adding the count value "b" read from the cache 105 to the count value "B" of flow2 sent as a response from the flow table 101, to the flow table address "dddd23" in the flow table 101 (see reference sign P36 in FIG. 26). This process corresponds to operations B7 and B8 in the flowchart illustrated in FIG. 5.

Effects

As described above, according to the virtual router 1 that is an example of the embodiment, each cache 105 includes the burst control circuit 106, and each burst control circuit 106 includes the ROW address management table 110 that manages the flows with the same ROW address.

When the counters in the flow table 101 are updated, the update circuit 112 controls the order in which the multiple input flows are to be processed such that flows whose ROW addresses of the flow table addresses are the same are consecutively arranged.

This may reduce the number of times of switching of the ROW address performed on the on-board memory 5 (DRAM) in the updating of the counter values of the flow table 101, and reduce occurrence of a delay (penalty) in memory access. Accordingly, it is possible to suppress decrease in the performance in the updating of the flow table 101 in the virtual router 1 and to improve the performance of the virtual router 1.

The update circuit 112 includes the count value outstand that manages the number (waiting number) of consecutive flows that have the same ROW address as the access destinations. When the update circuit 112 detects consecutive flows that have the same ROW address as the access destinations while requesting for reading of the counter value to the flow table 101, the update circuit 112 increments the count value outstand.

When the update circuit 112 detects responses for the consecutive flows that have the same ROW address as the access destinations while receiving the response of the counter value from the flow table 101, the update circuit 112 decrements the count value outstand.

When the count value outstand is a value other than 0, the update circuit 112 stalls the process (memory access to the on-board memory 5) for the flow, and goes into the standby state. This allows the update circuit 112 to reliably wait for consecutive flows that have the same ROW address as the access destinations. Accordingly, it is possible to reduce consecutive memory access operations to different ROW addresses and reduce occurrence of a delay (penalty) in the memory access.

Figure 27:
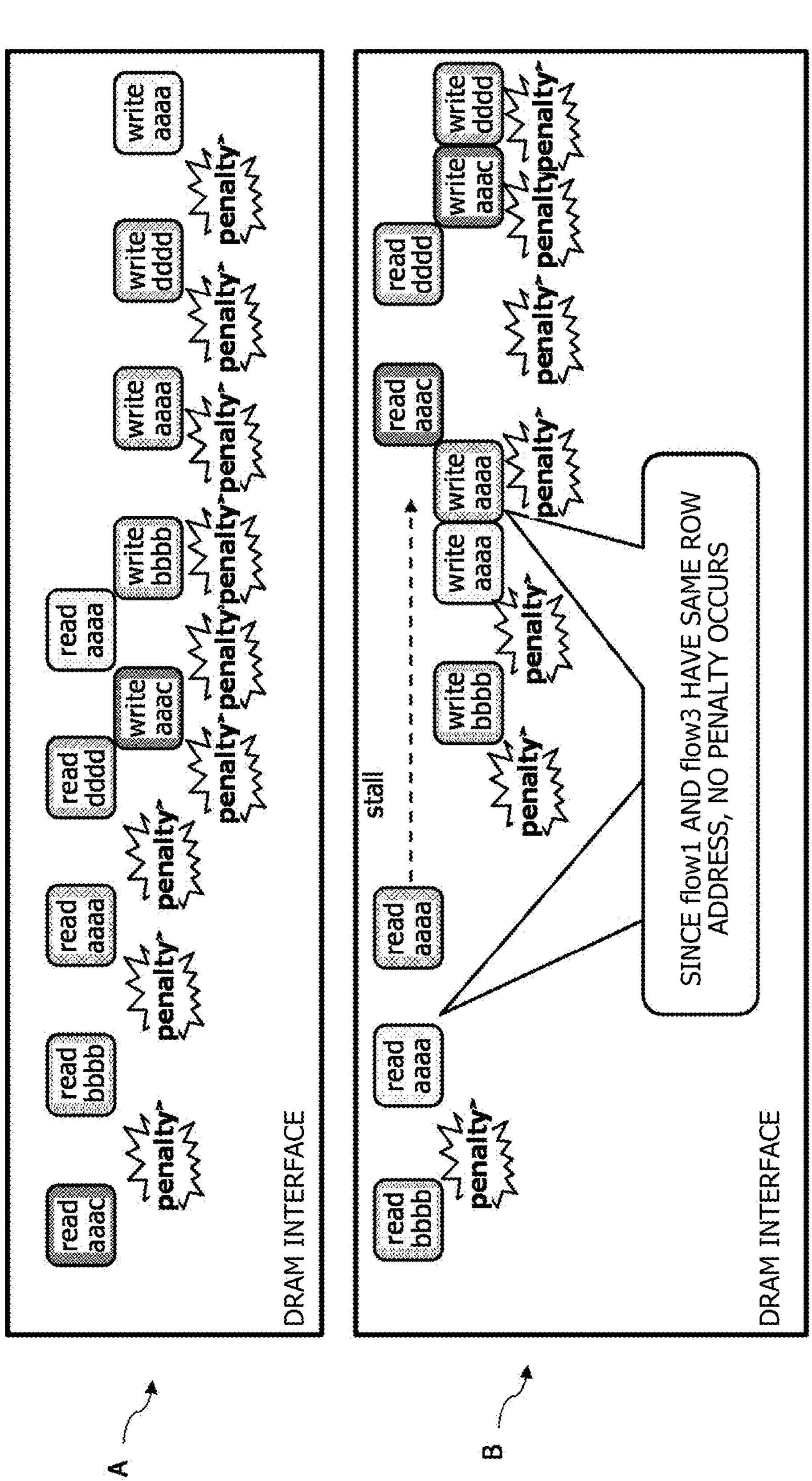
FIG. 27 is a diagram illustrating memory access in an on-board memory performed when counter values of the flow table are updated in the virtual router that is an example of the embodiment, the memory access illustrated in comparison with memory access in a method of a related art.
Figure 29:
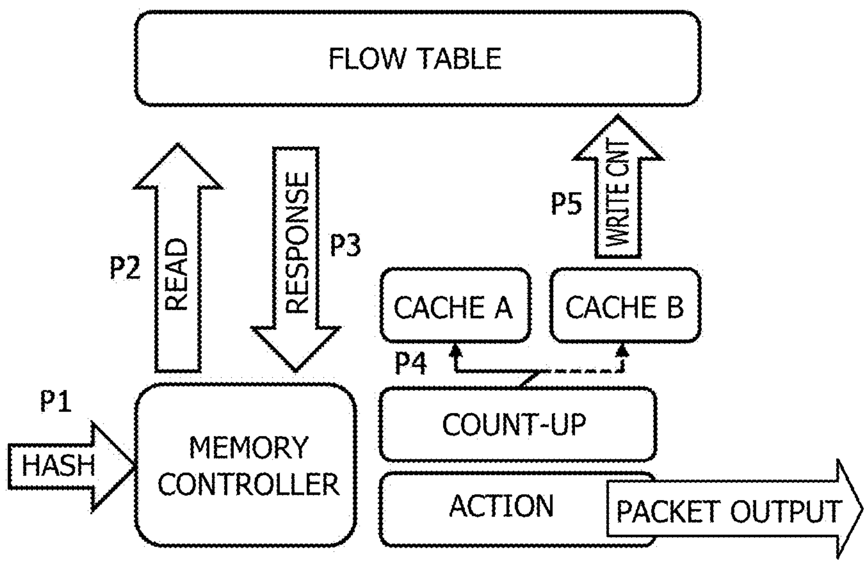
FIG. 29 is a diagram schematically illustrating a function for updating counters of a flow table in a virtual router of a related art.
Figure 30:
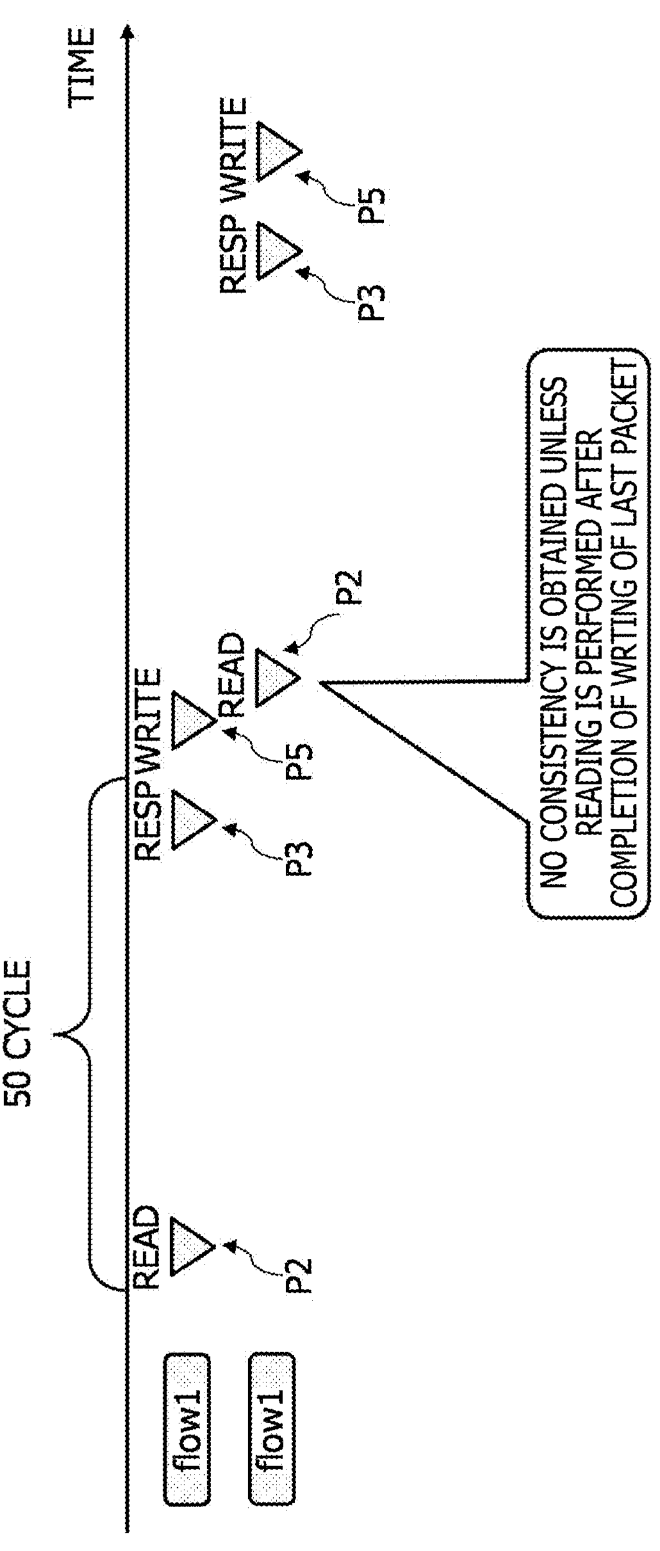
FIG. 30 is a diagram illustrating timings of the respective processes illustrated in FIG. 29.
Figure 31:
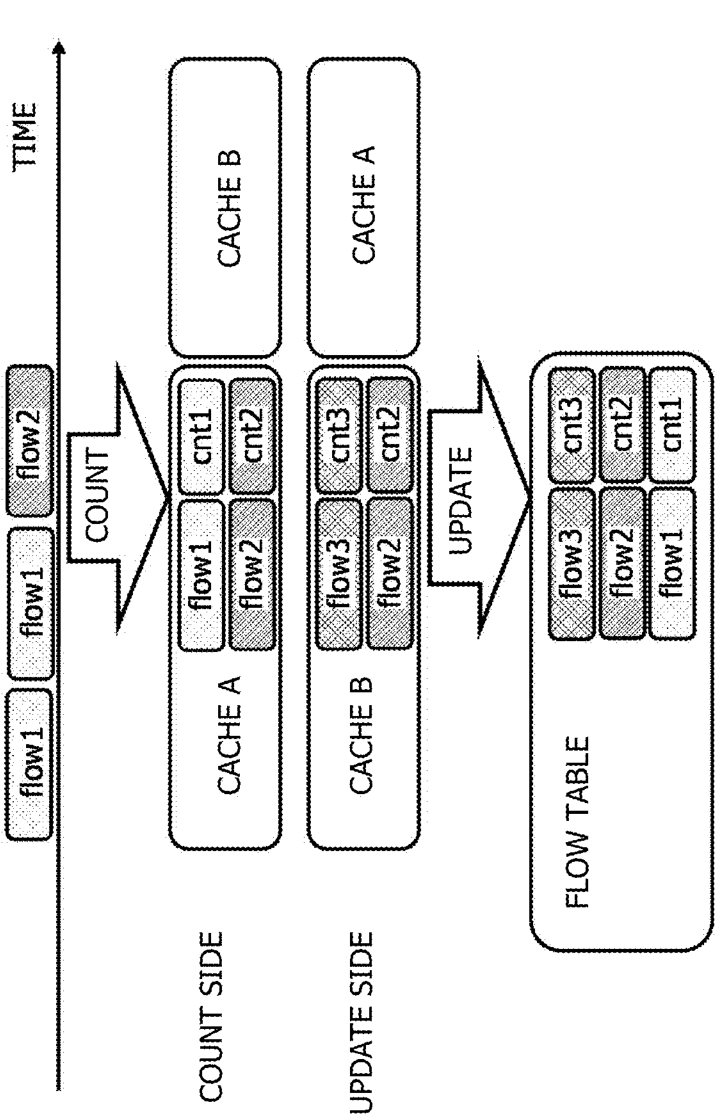
FIG. 31 is a diagram for explaining a process of updating the counters of the flow table in the virtual router of the related art.

FIG. 27 is a diagram illustrating the memory access in the on-board memory 5 (DRAM) performed when the counter values of the flow table 101 are updated in the virtual router 1 that is an example of the embodiment, the memory access illustrated in comparison with memory access in a method of related art.

In FIG. 27, reference sign A denotes the memory access in the DRAM when the counter values of the flow table 101 are updated by the method of related art, and reference sign B denotes the memory access in the DRAM when the counter values of the flow table 101 are updated by the virtual router 1.

In the virtual router 1 of the present embodiment, when the counter values of the flow table 101 are updated, the burst control circuit 106 rearranges the flows such that flow1 and flow3 with the same ROW address are consecutively arranged. This may reduce the number of times of switching of the ROW address and reduce occurrence of a delay (penalty) in the memory access.

Others

The disclosed technique is not limited to the embodiment described above, and may be carried out while being variously modified within a scope not departing from the gist of the present embodiment. The configurations and processes of the present embodiment may be selectively employed or omitted as desired, or may be combined as appropriate.

For example, although the example in which the burst control circuits 106 are provided in the FPGA 10 is described in the above-described embodiment, the configuration is not limited thereto. For example, the CPU 2 of the information processing apparatus 20 may implement the functions as the burst control circuits 106.

For example, the CPU 2 of the information processing apparatus 20 may implement functions similar to those of the new registration check circuit 111, the ROW address management table 110, and the update circuit 112 described above by executing a control program.

The program (control program) for implementing functions similar to those of the new registration check circuit 111, the ROW address management table 110, and the update circuit 112 may be provided in a form recorded in a computer-readable recording medium such as, for example, a flexible disk, a compact disc (CD (CD-ROM, CD-recordable (R), CD-rewritable (RW), or the like)), a Digital Versatile Disc DVD ((DVD-ROM, DVD-RAM, DVD-R, DVD+R, DVD-RW, DVD+RW, HD DVD, or the like)), a Blu-ray disc, a magnetic disk, an optical disc, or a magneto-optical disk. A computer uses the program by reading the program from the recording medium, transferring the read program to an internal or external storage device, and storing the program in the internal or external storage device. The program may be recorded in a storage device (recording medium) such as, for example, a magnetic disk, an optical disc, or a magneto-optical disk, and provided from the storage device to the computer via a communication channel.

When the functions similar to those of the new registration check circuit 111, the ROW address management table 110, and the update circuit 112 are to be implemented, a microprocessor (for example, the CPU 2) of the computer executes the program stored in the internal storage device (for example, the system memory 3). In this case, the computer may read and execute the program recorded on the recording medium.

The above-described disclosure enables a person skilled in the art to carry out and manufacture the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:

a memory in which route information in flow control is stored, and in which a plurality of flows that include a same ROW address as access destinations are stored in correspondence with the same ROW address, thereby the plurality of flows is stored as a single group when counter values managed in the route information are updated; and a processor coupled to the memory and configured to:

control such that the plurality of flows with the same ROW address are processed consecutively by rearranging an order of the plurality of flows, increment a counter configured to count a number of consecutive flows that include the same ROW address as access destinations; and reduce a number of times of switching of the ROW address for the memory by accessing the memory consecutively for the plurality of flows that include the same ROW address as the access destinations to update the counter values.

2. The information processing apparatus according to claim 1, wherein the processor is further configured to:

when detecting the consecutive flows that include the same ROW address as access destinations while requesting for reading of the counter value to the route information, decrement the counter when detecting responses for consecutive flows that include the same ROW address as access destinations while receiving a response of the counter value from the route information, and stall a memory access to the memory for the flows when the counter takes a value other than 0.

3. The information processing apparatus according to claim 2, wherein the counter value indicates a number of times packets having the same route information arrive, and the processor is further configured to create a counter update value by adding the counter value corresponding to a packet to be processed to the counter value read from a flow table that is used as the route information expressing a transfer route of the packet.

4. A control method comprising:

storing route information in flow control into a memory;

by storing a plurality of flows that include a same ROW address as access destinations in correspondence with the same ROW address, storing the plurality of flows as a single group when counter values managed in the route information are updated into the memory;

controlling such that the plurality of flows with the same ROW address are processed consecutively by rearranging an order of the plurality of flows; and incrementing a counter configured to count a number of consecutive flows that include the same ROW address as access destinations;

reducing a number of times of switching of the ROW address for the memory by accessing the memory consecutively for the plurality of flows that include the same ROW address as access destinations to update the counter values, by a processor.

5. The control method according to claim 4, further comprising:

when detecting the consecutive flows that include the same ROW address as access destinations while requesting for reading of the counter value to the route information, decrementing the counter when detecting responses for consecutive flows that include the same ROW address as access destinations while receiving a response of the counter value from the route information, and stalling a memory access to the memory for the flows when the counter takes a value other than 0.

6. The control method according to claim 5, wherein the counter value indicates a number of times packets having the same route information arrive, and further comprising creating a counter update value by adding the counter value corresponding to a packet to be processed to the counter value read from a flow table that is used as the route information expressing a transfer route of the packet.

7. A non-transitory computer-readable recording medium storing a control program that causes a computer to execute a process, the process comprising:

storing route information in flow control into a memory;

by storing a plurality of flows that include a same ROW address as access destinations in correspondence with the same ROW address, storing the plurality of flows as a single group when counter values managed in the route information are updated into the memory;

controlling such that the plurality of flows with the same ROW address are processed consecutively by rearranging an order of the plurality of flows;

incrementing a counter configured to count a number of consecutive flows that include the same ROW address as access destinations, and reducing a number of times of switching of the ROW address for the memory by accessing the memory consecutively for the plurality of flows that include the same ROW address as access destinations to update the counter values.

8. The non-transitory computer-readable recording medium according to claim 7, further comprising:

when detecting the consecutive flows that include the same ROW address as access destinations while requesting for reading of the counter value to the route information, decrementing the counter when detecting responses for consecutive flows that include the same ROW address as access destinations while receiving a response of the counter value from the route information, and stalling a memory access to the memory for the flows when the counter takes a value other than 0.

9. The non-transitory computer-readable recording medium according to claim 8, wherein the counter value indicates a number of times packets having the same route information arrive, and further comprising creating a counter update value by adding the counter value corresponding to a packet to be processed to the counter value read from a flow table that is used as the route information expressing a transfer route of the packet.

* * * * *